Jan. 10, 1939.  P. A. ABE  2,143,255
LATHE
Filed July 27, 1935  17 Sheets-Sheet 1

Inventor
PHILBER A. ABE,
By Toulmin & Toulmin
Attorneys

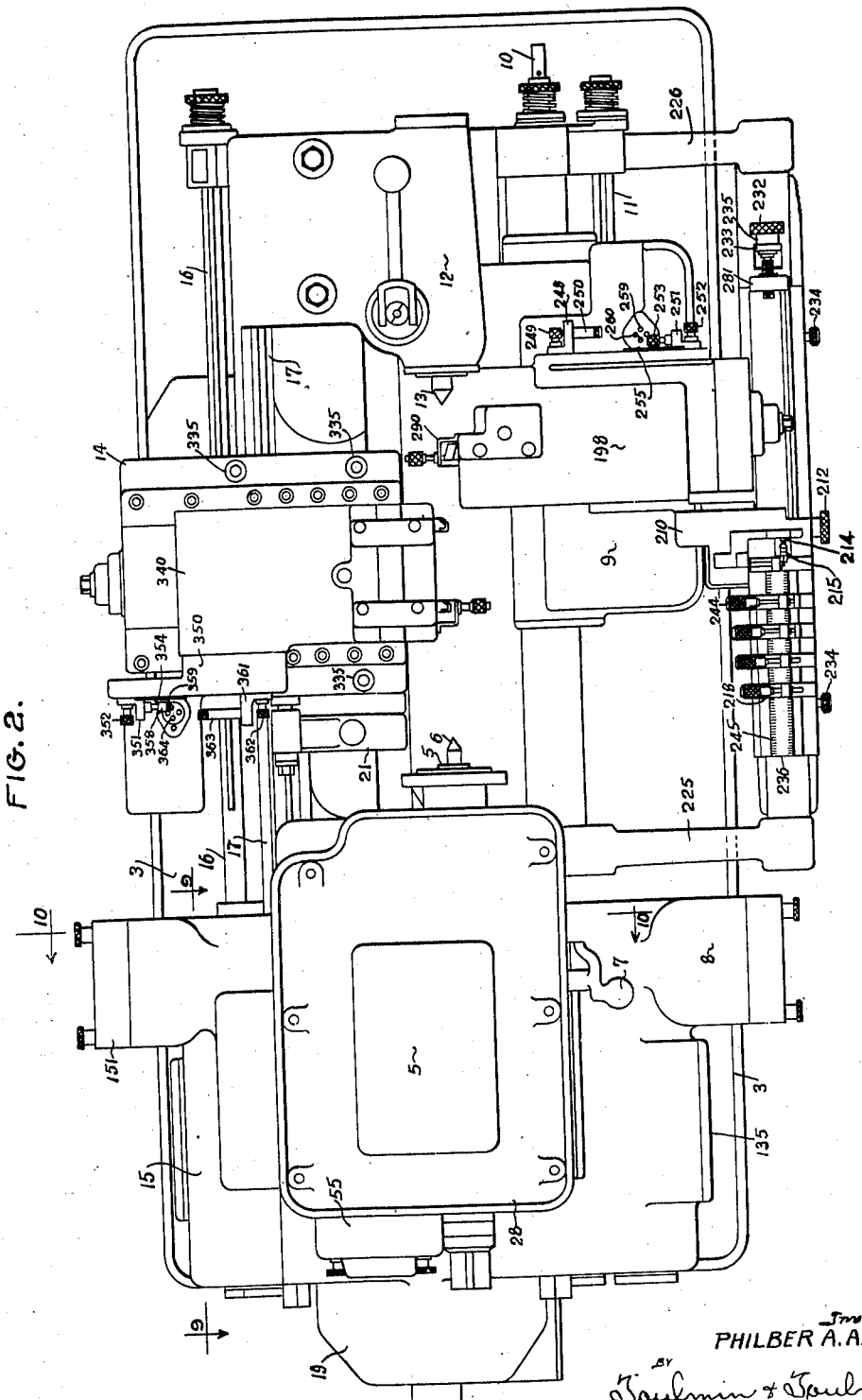

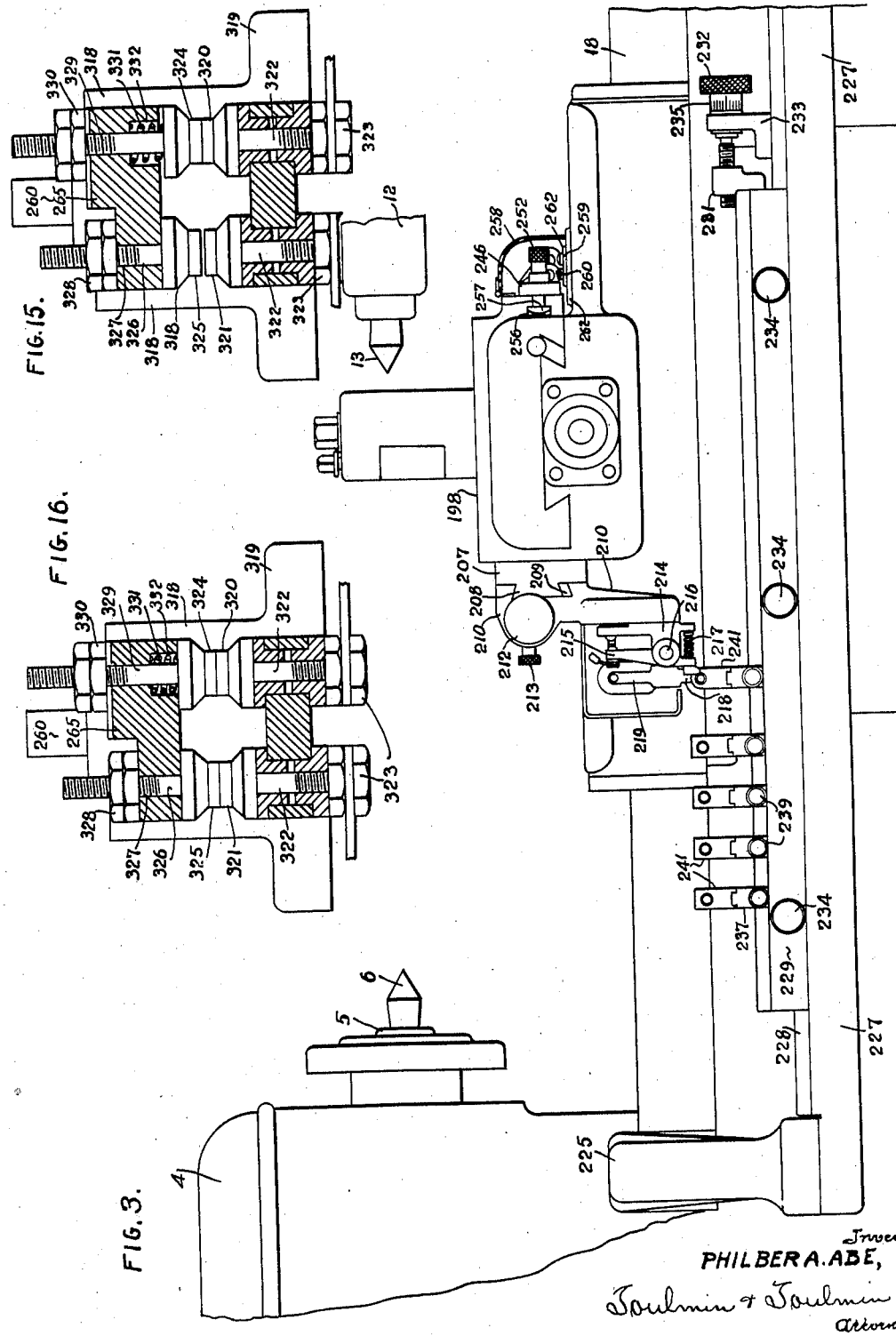

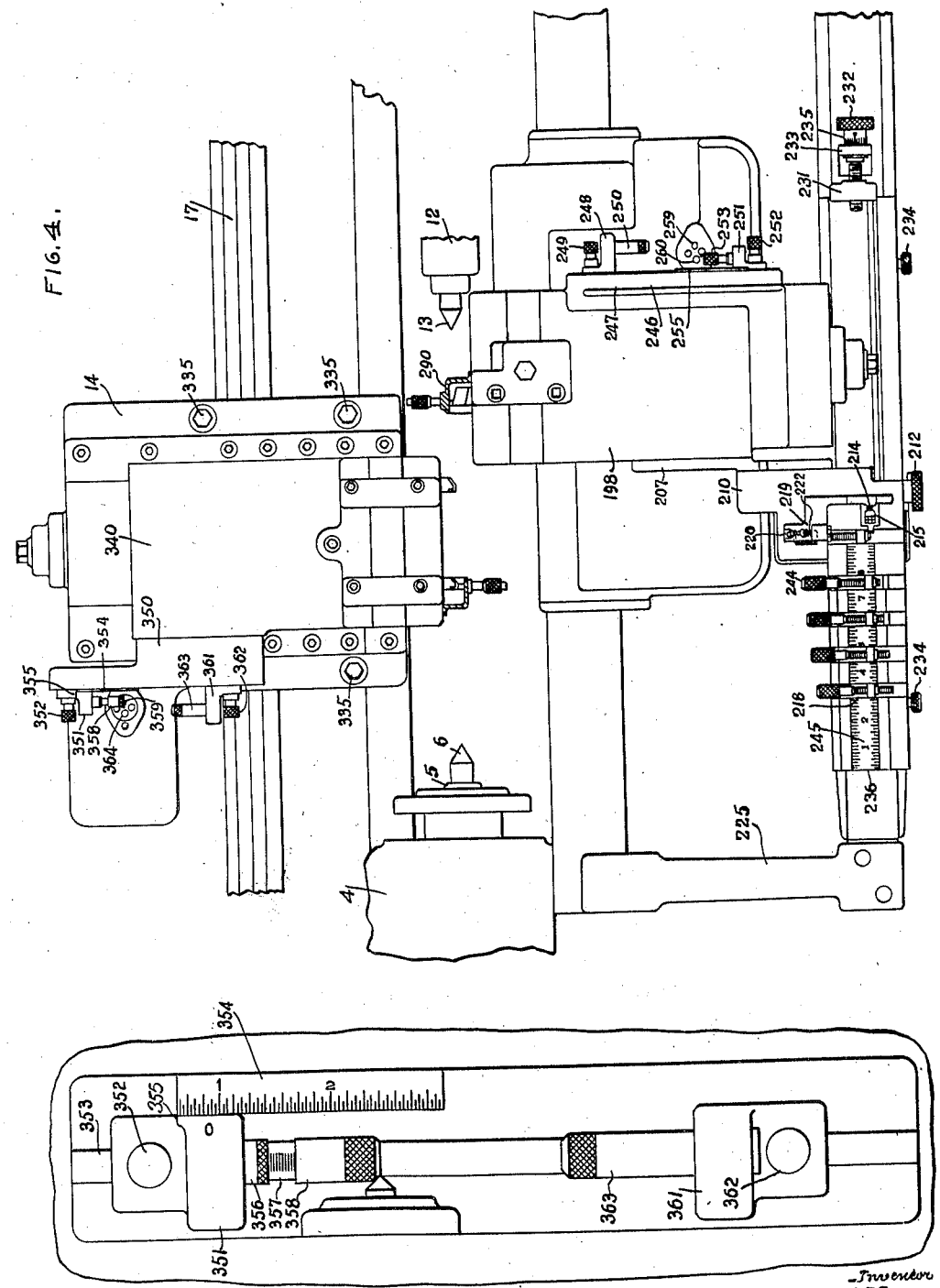

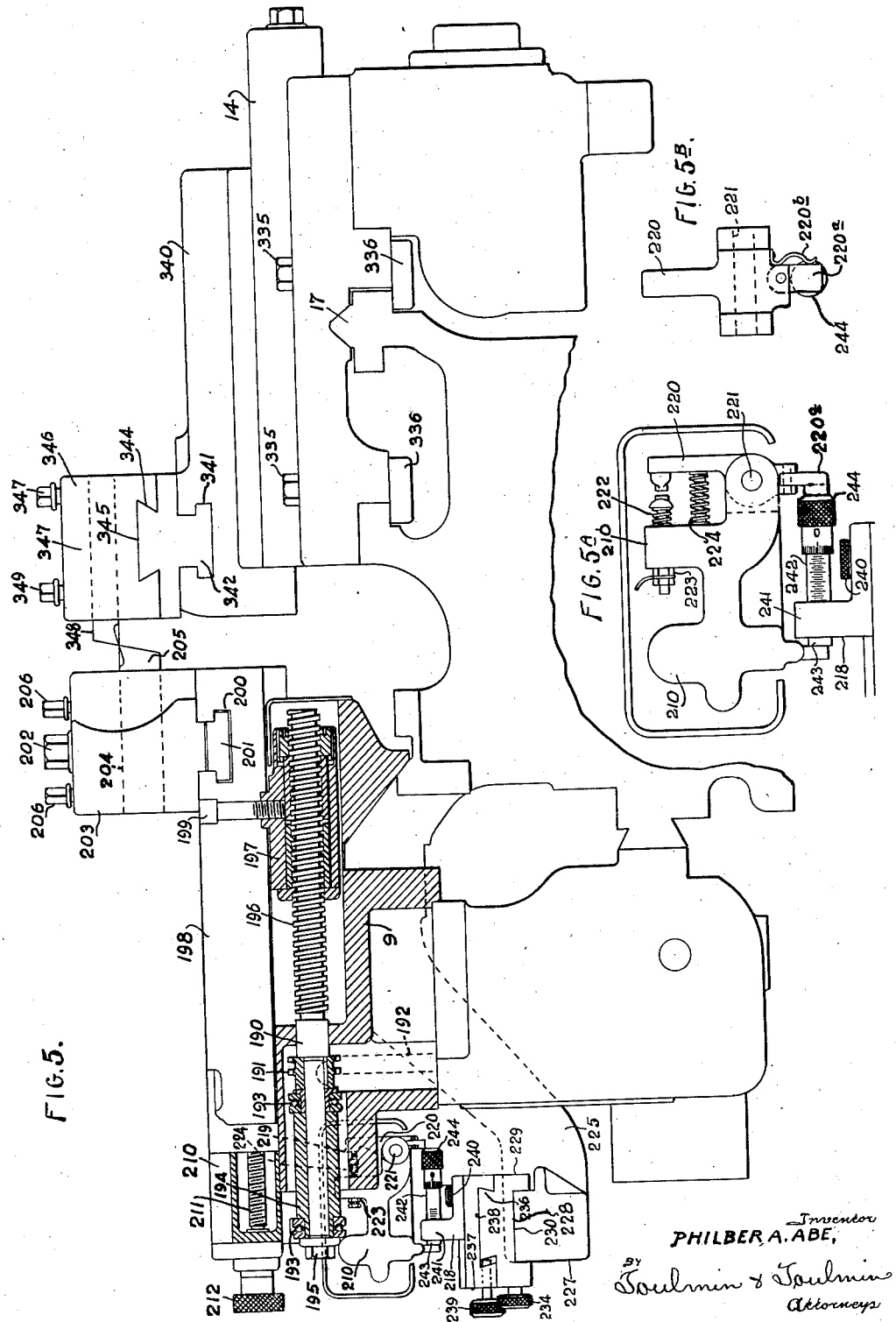

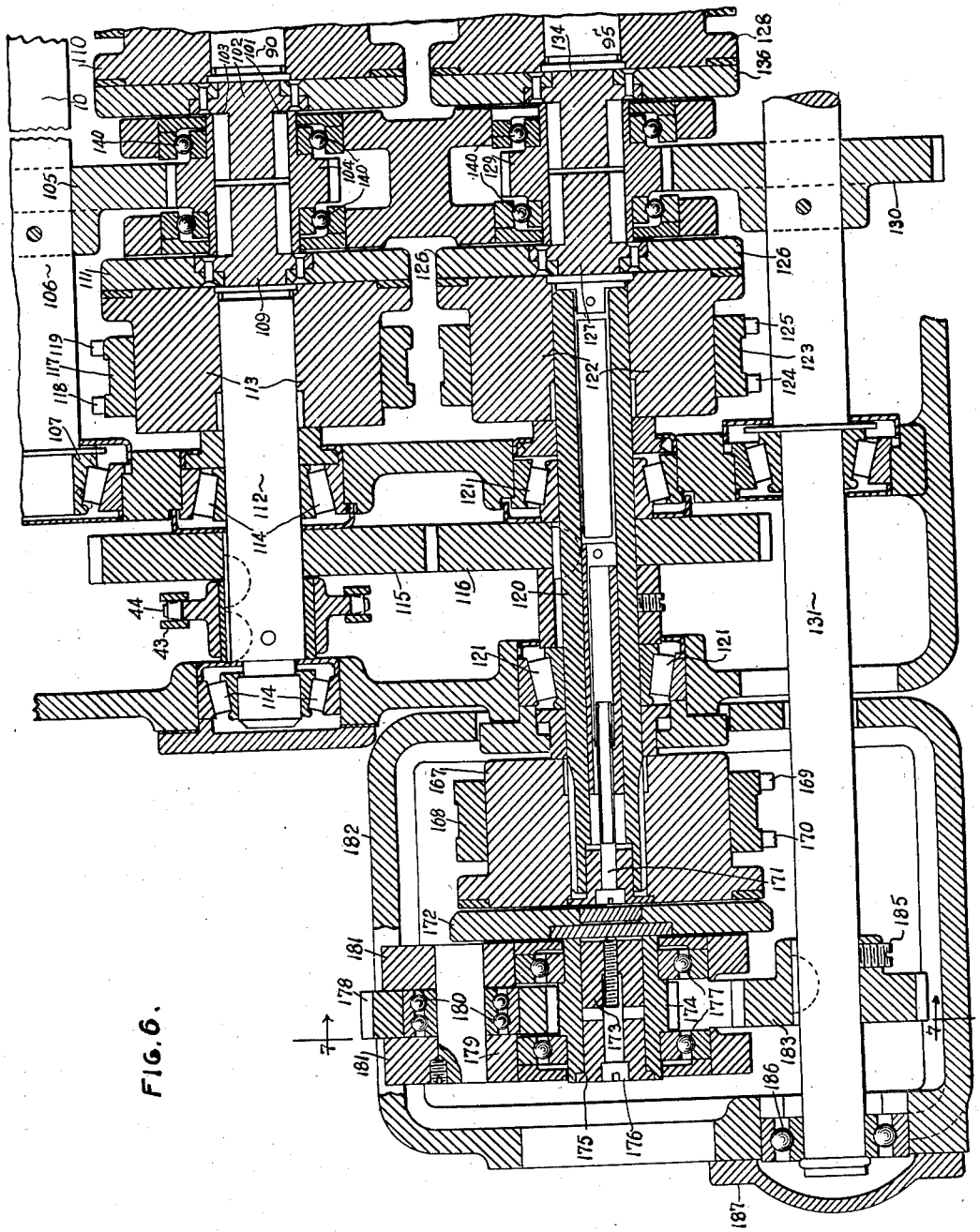

Jan. 10, 1939.  P. A. ABE  2,143,255
LATHE
Filed July 27, 1935   17 Sheets-Sheet 7

Inventor
PHILBER A. ABE,
BY
Toulmin & Toulmin
Attorneys

Jan. 10, 1939.　　　　P. A. ABE　　　　2,143,255
LATHE
Filed July 27, 1935　　　17 Sheets-Sheet 8

PHILBER A. ABE, *Inventor*

BY Toulmin & Toulmin
*Attorneys*

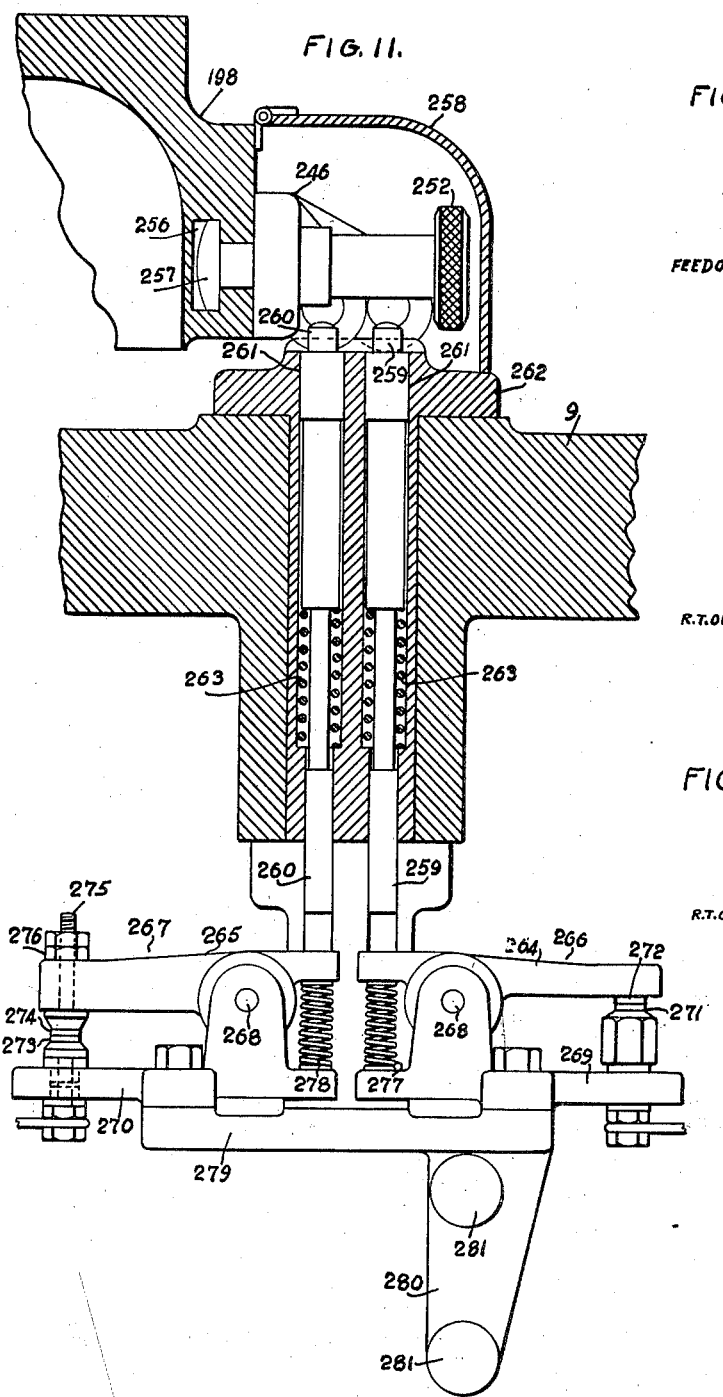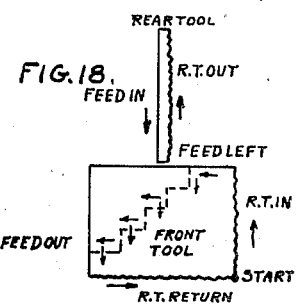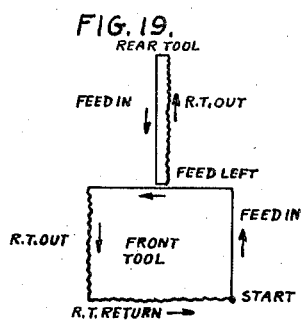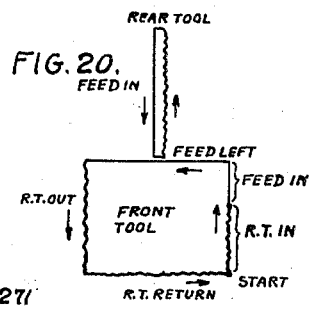

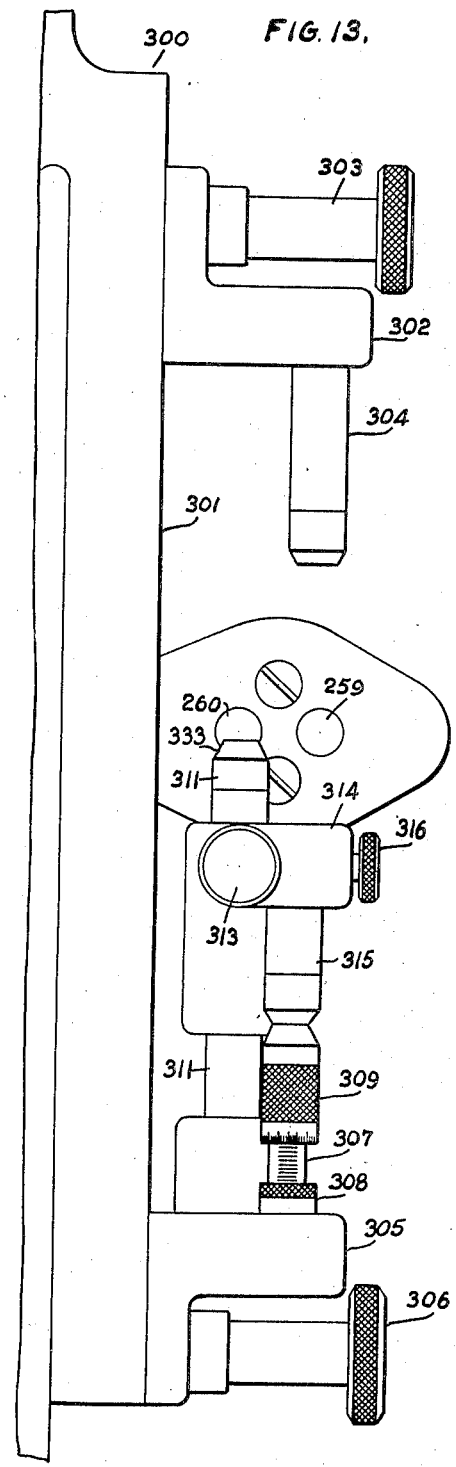
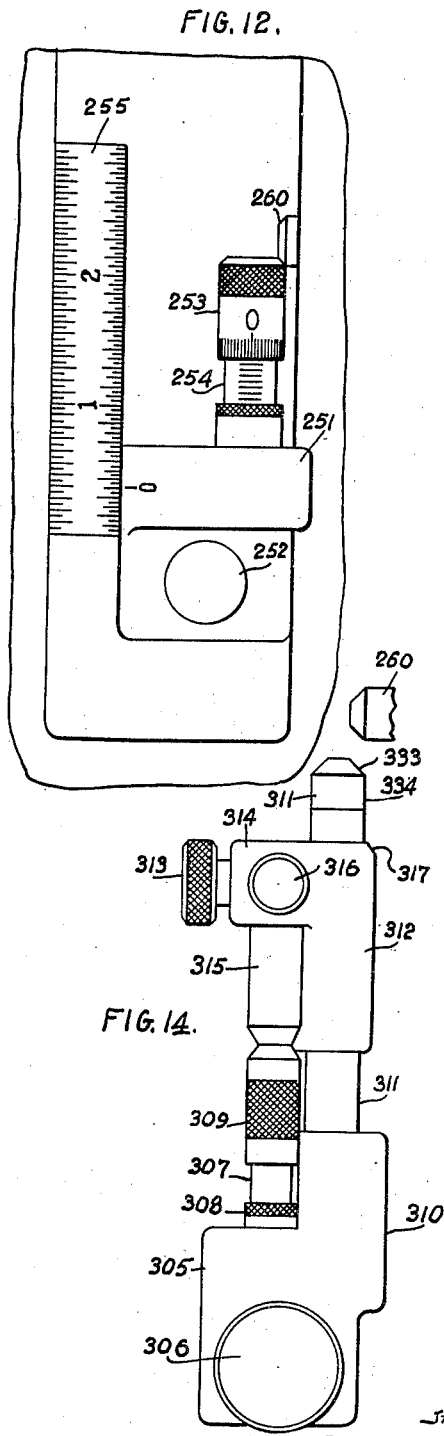

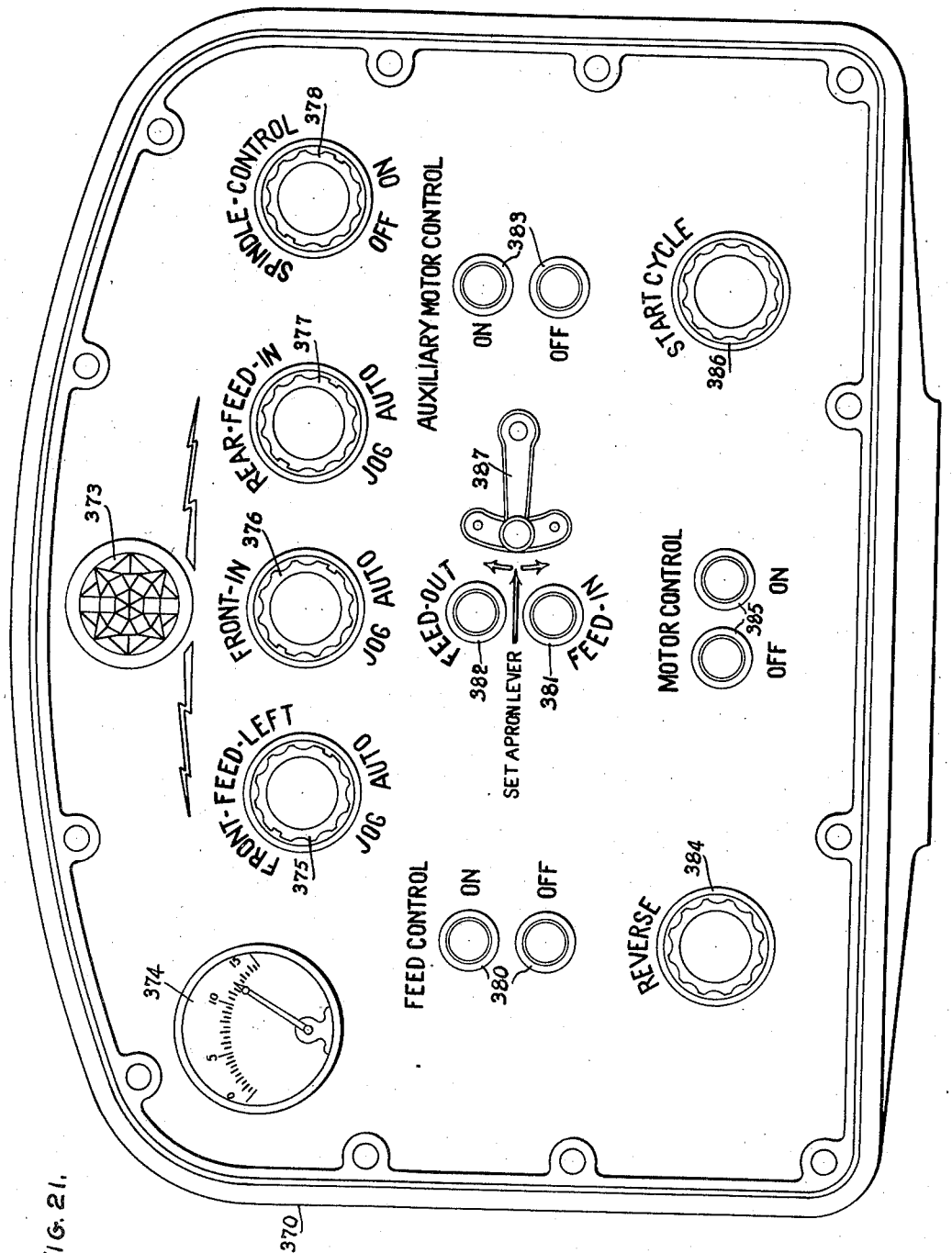

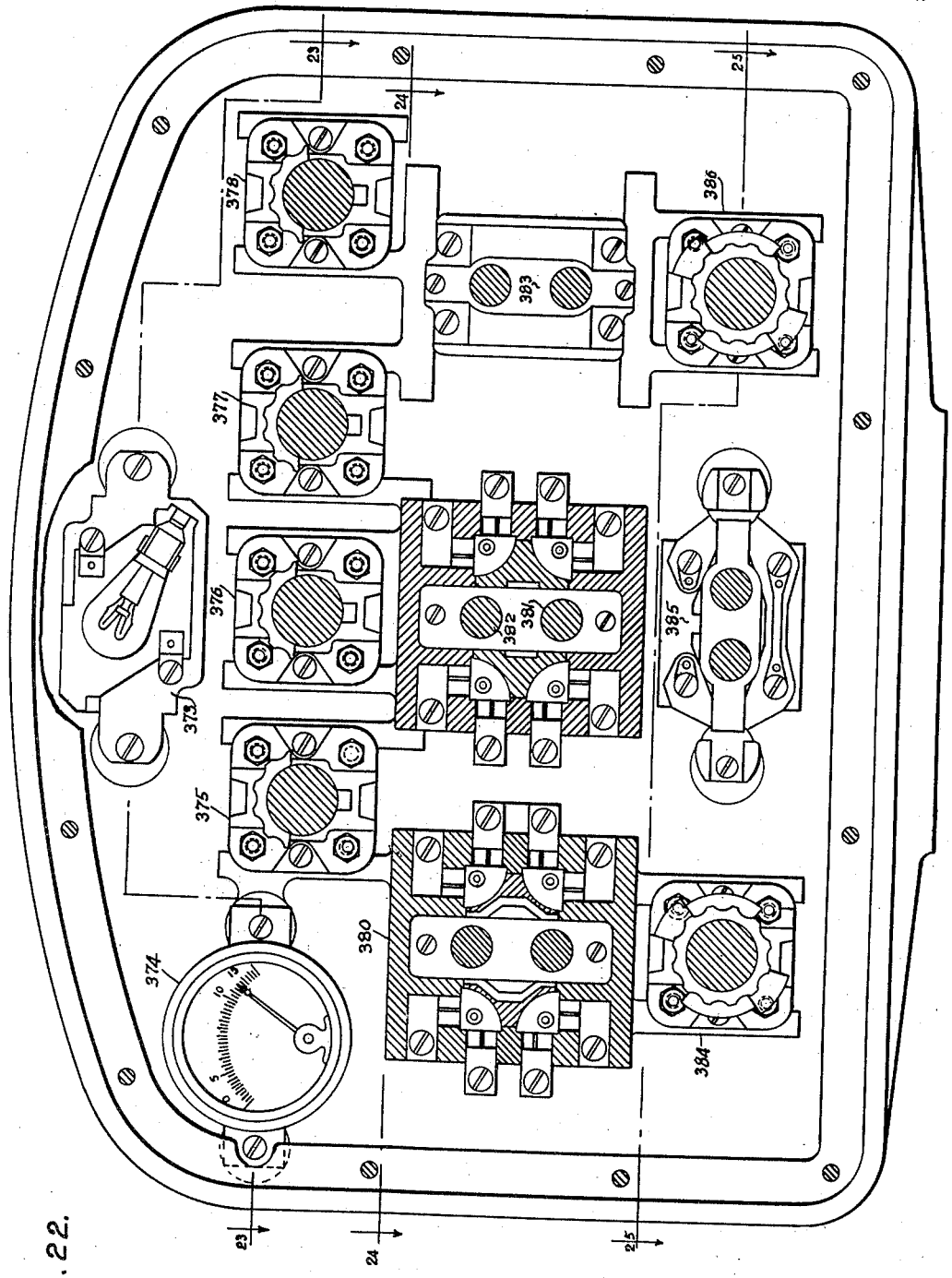

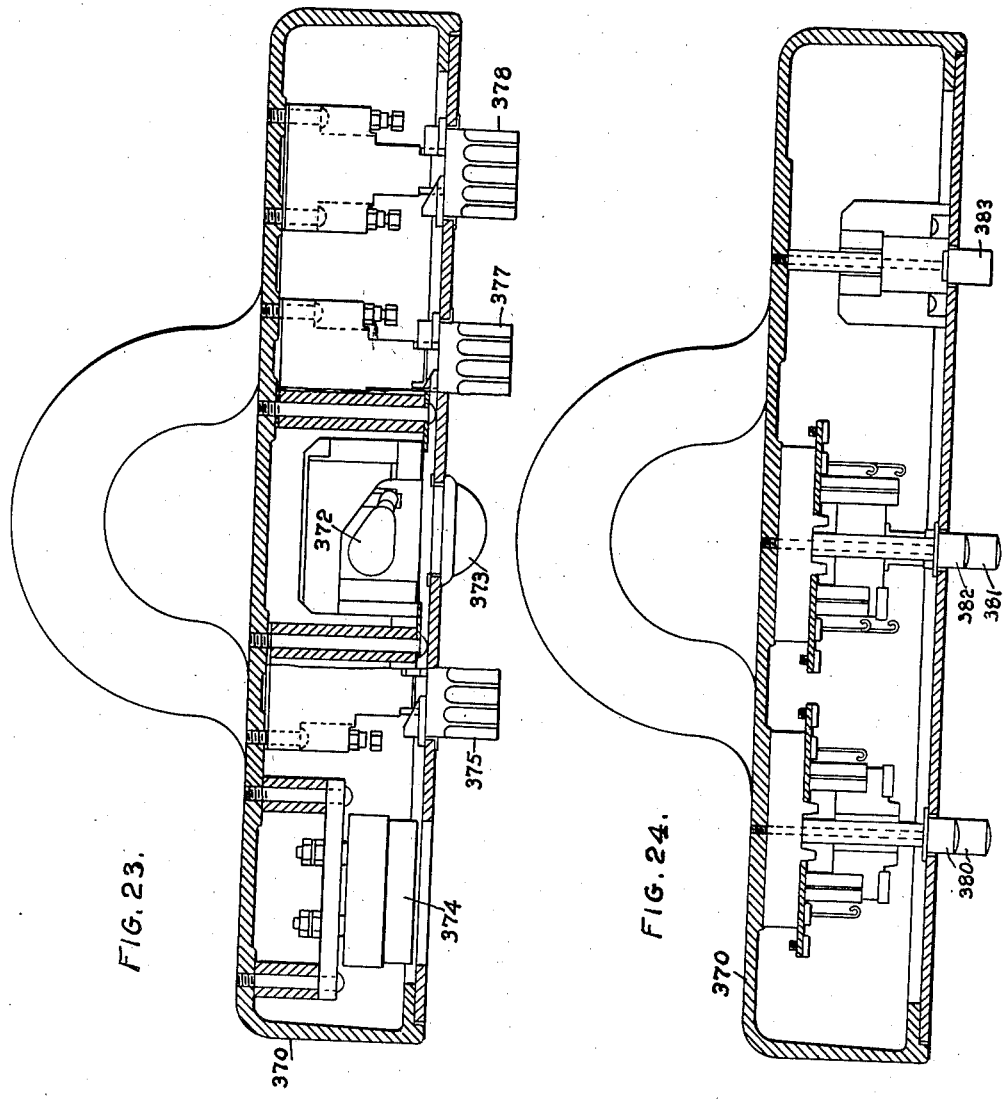

Jan. 10, 1939.  P. A. ABE  2,143,255
LATHE
Filed July 27, 1935   17 Sheets-Sheet 14
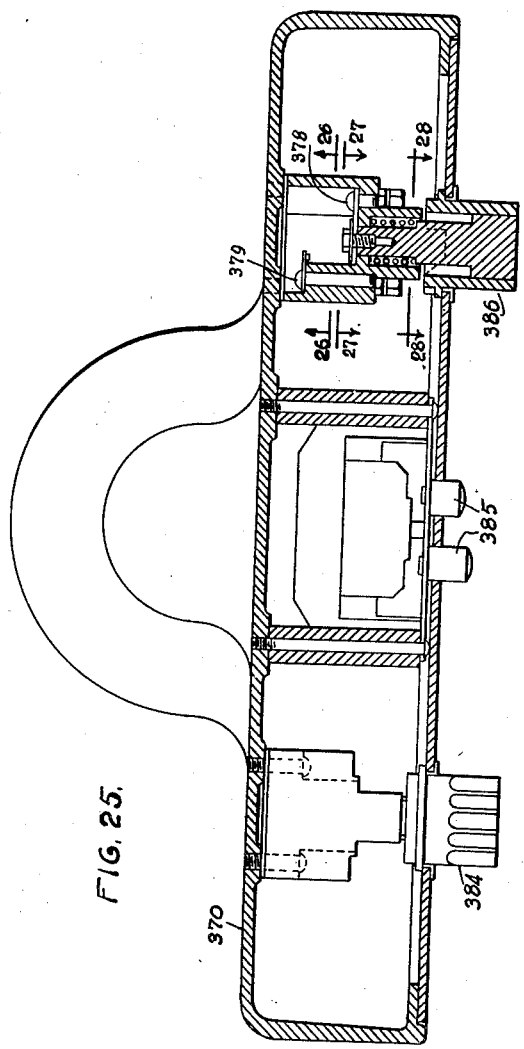
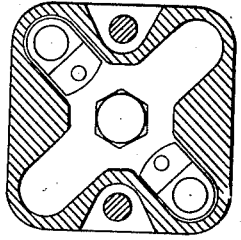
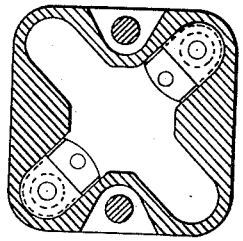
PHILBER A. ABE, *Inventor*
BY Toulmin & Toulmin
*Attorneys*

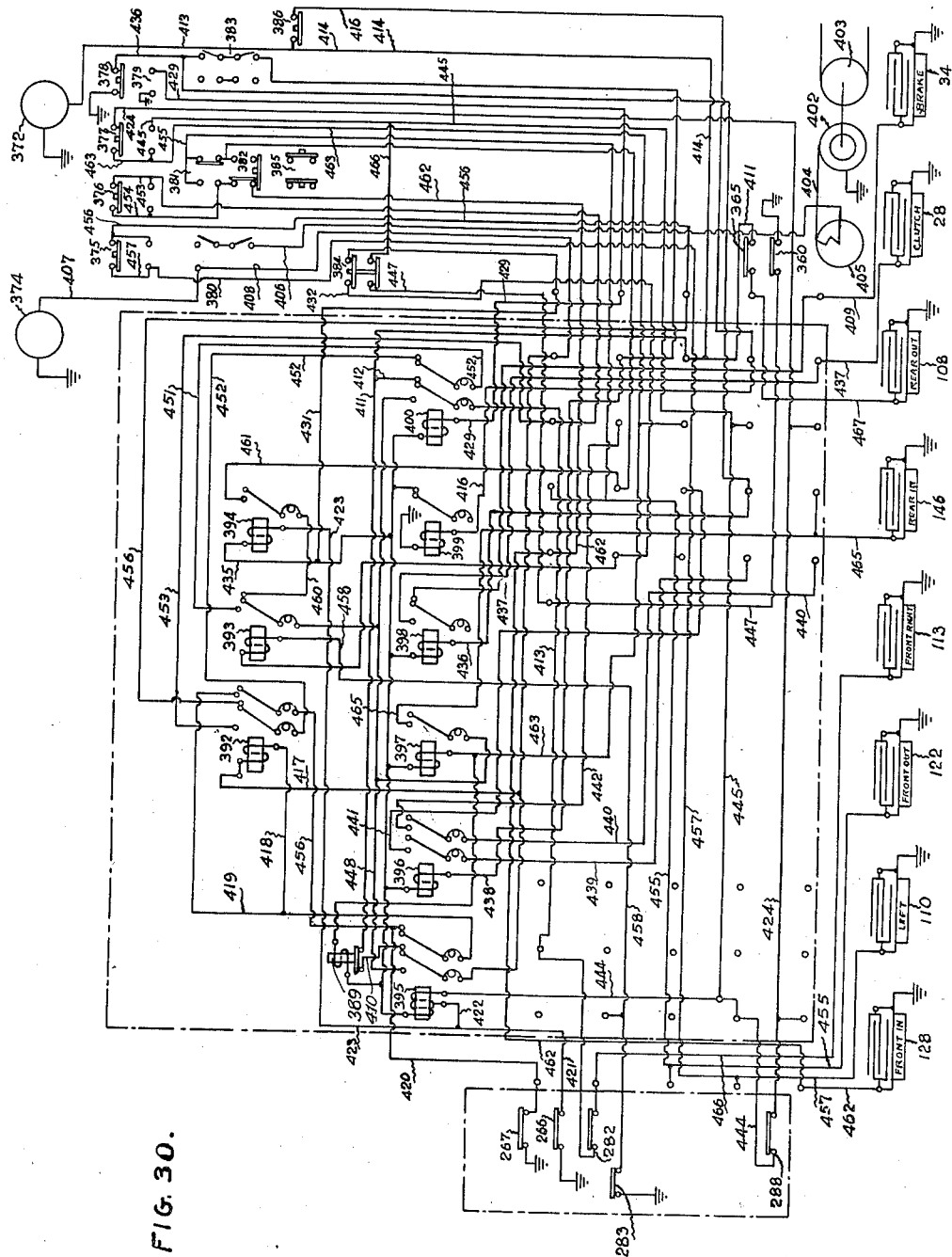

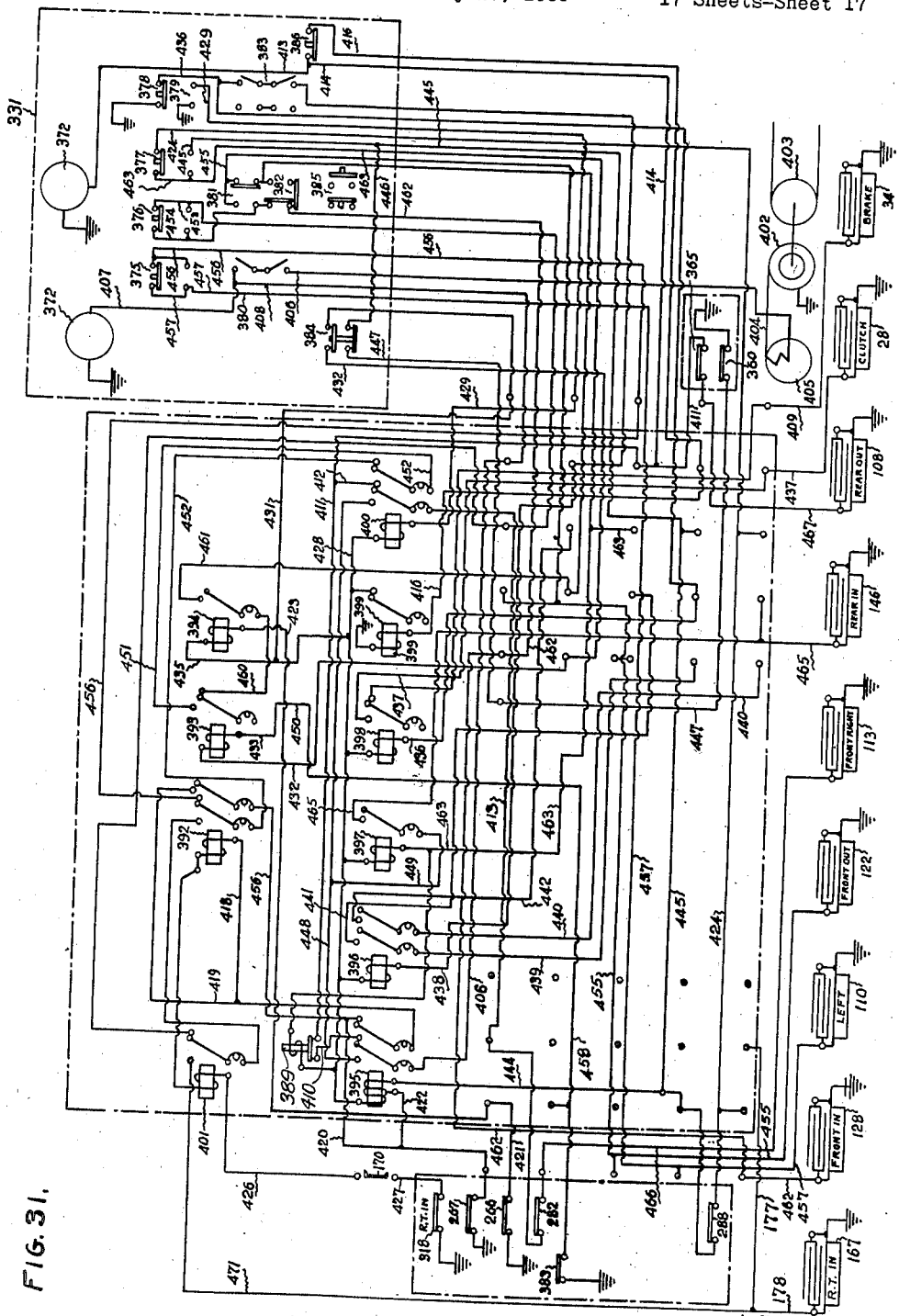

Patented Jan. 10, 1939

2,143,255

UNITED STATES PATENT OFFICE 2,143,255

LATHE

Philber A. Abe, Sidney, Ohio, assignor to The Monarch Machine Tool Company, Sidney, Ohio, a corporation of Ohio Application July 27, 1935, Serial No. 33,542

26 Claims. (Cl. 82—2)

This invention relates to lathes, and in particular, to apparatus for automatically controlling the operations of tools in turning articles of various configuration.

One object of my invention is to provide apparatus for controlling the motions of a machine tool automatically, whereby the tool first rapidly traverses into the position where it engages the work; then feeds longitudinally for a predetermined distance; then rapid traverses out for a predetermined distance; and finally, rapid traverses back to its starting point.

Another object is to provide such apparatus, as described immediately above, but wherein the tool is caused to move longitudinally a predetermined distance; then transversely another predetermined distance; then longitudinally a third predetermined distance and so on until a plurality of stepped portions have been cut on the lathe, the tool returning to its starting point by a rapid traverse motion after the last stepped portion has been cut.

Another object is to provide apparatus for automatically controlling the operation of a machine tool, wherein the tool rapid traverses inward a predetermined distance; then feeds inward beyond this point for another predetermined distance; and then moves in the previously described manner longitudinally forward, transversely outward, and longitudinally backward to the starting point.

Another object is to provide apparatus for automatically controlling the motions of a machine tool, wherein the tool is caused to feed inwardly for a predetermined distance; then to feed longitudinally in one direction for another predetermined distance; then transversely outward for another predetermined distance; and finally longitudinally in the opposite direction to the starting point, preferably by a rapid traverse motion.

Another object is to provide a lathe having means for rapidly traversing the tool inwardly for a predetermined distance; then for causing the tool to execute a series of transverse and longitudinal movements so as to cut several stepped portions upon the work; then to rapid traverse or feed the tool outwardly until a predetermined position has been reached; and finally to cause the tool to execute a rapid traverse movement back to the starting point.

Another object is to provide a lathe of the type described above, wherein a rear carriage operates in cooperation with a front carriage having the previously described movements.

Another object is to provide a lathe having means for causing a front tool to feed inwardly for a predetermined distance; then to feed longitudinally for another predetermined distance; then to rapidly traverse outwardly to a predetermined position; then to hold the front tool motionless while a rear tool feeds inwardly into the work and executes its cutting stroke; whereupon both the front tool and the rear tool simultaneously rapid traverse back to their starting points.

Another object is to provide a lathe of the type described in the preceding paragraph, but wherein one of the tools is caused to "dwell" at the end of its feeding or cutting stroke so as to completely cut away the work and overcome the "spring" and surface roughness of the material, after which the rapid traverse movement of the tool takes place, in the previously described manner.

Another object is to provide a double tool lathe, wherein means is provided for rapidly traversing the front tool inwardly toward the work for a predetermined distance; thereafter feeding the tool inwardly for another predetermined distance; then feeding the tool longitudinally in one direction either by a continuous path or by a step-like path, as previously described; then feeding or rapidly traversing the front tool outward to a predetermined position, where it holds temporarily; then causing the rear tool to feed inwardly and accomplish its cutting-away stroke; and then finally to cause both the front tool and the rear tool to rapid traverse back to their respective starting points.

Another object is to provide a lathe having a series of micrometer stops arranged to operate a switch or switches so as to enable the cutting of stepped workpieces without the necessity of depending upon follower switches sliding on templates, or having running contact with micrometer heads.

Another object is to provide lathes of the previously described types, wherein a single-voltage electrical circuit is employed for operating the various magnetic clutches, switches and relays instead of the two-voltage circuits previously used, thereby greatly simplifying the machine and reducing the cost of manufacture.

Another object is to provide means in such a lathe to "inch" or "jog" the tool toward or from the work by manually controlled devices.

Another object is to provide such a lathe having electrical means whereby the rapid traverse outward feed apparatus may be employed for a rapid traverse inward feed by means of devices for rearranging the circuit at the option of the operator.

Another object is to provide a micrometer stop arrangement for operating limit switches employed in connection with lathes of the previously described types, whereby the tool is caused to halt and change its direction at predetermined points in its cycle of operations.

In the drawings:

Figure 2 is a top plan view of the lathe.

Figure 3 is an enlarged front elevation showing the front carriage of the lathe.

Figure 4 is an enlarged top plan view of the front and rear carriage mechanism shown in Figure 2.

Figure 5 is an end elevation, partly in section, of the lathe, showing the front and rear carriages.

Figure 5A is a detail view of a switch shown in Figure 5.

Figure 5B is a right-hand end view of the switch shown in Figure 5A.

Figure 6 is a layout section through the front gear box for operating the front carriage mechanism.

Figure 11 is a vertical section through the front carriage tool slide and transverse limit switches.

Figure 12 is a fragmentary side elevation of the tool slide stop mechanism shown in Figure 4.

Figure 13 is a top elevation of a modified form of slide stop assembly adapted to cause the tool to rapid traverse inward for a predetermined distance, and then feed inward for another predetermined distance.

Figure 14 is a side elevation of a portion of the mechanism shown in Figure 13.

Figure 15 is a vertical section through the traverse-in and feed-in switches employed in connection with the stop assembly shown in Figures 13 and 14, with one switch closed.

Figure 16 is a view similar to Figure 15 but with both switches closed.

Figure 17 is a side elevation of the rear carriage stop assembly shown in plan view in Figures 2 and 4.

Figure 18 is a diagrammatic view showing the operating cycle in one embodiment of my invention.

Figure 19 is a diagrammatic view showing the operating cycle in another embodiment of my invention.

Figure 20 is a diagrammatic view showing the operating cycle in a third embodiment of my invention.

Figure 21 is a front elevation of the control switchboard.

Figure 22 is a vertical section through the switchboard shown in Figure 21 taken immediately behind the front panel.

Figure 23 is an irregular horizontal section through the switchboard of Figures 21 and 22, taken approximately along the line 23—23 of Figure 22.

Figure 24 is a view similar to Figure 23, but taken along the line 24—24 of Figure 22.

Figure 25 is a view similar to Figures 23 and 24, but taken along the line 25—25 of Figure 22.

Figure 26 is a vertical section along the line 26—26 of Figure 25.

Figure 27 is a vertical section along the line 27—27 of Figure 25.

Figure 28 is a vertical section along the line 28—28 of Figure 25.

Figure 30 is a wiring diagram showing the electrical circuit in another embodiment of my invention.

Figure 31 is a wiring diagram showing the electrical circuits in a third embodiment of my invention.

General construction

In general, the lathe in which the present invention is shown embodied, is of the double carriage type.

Figure 1:
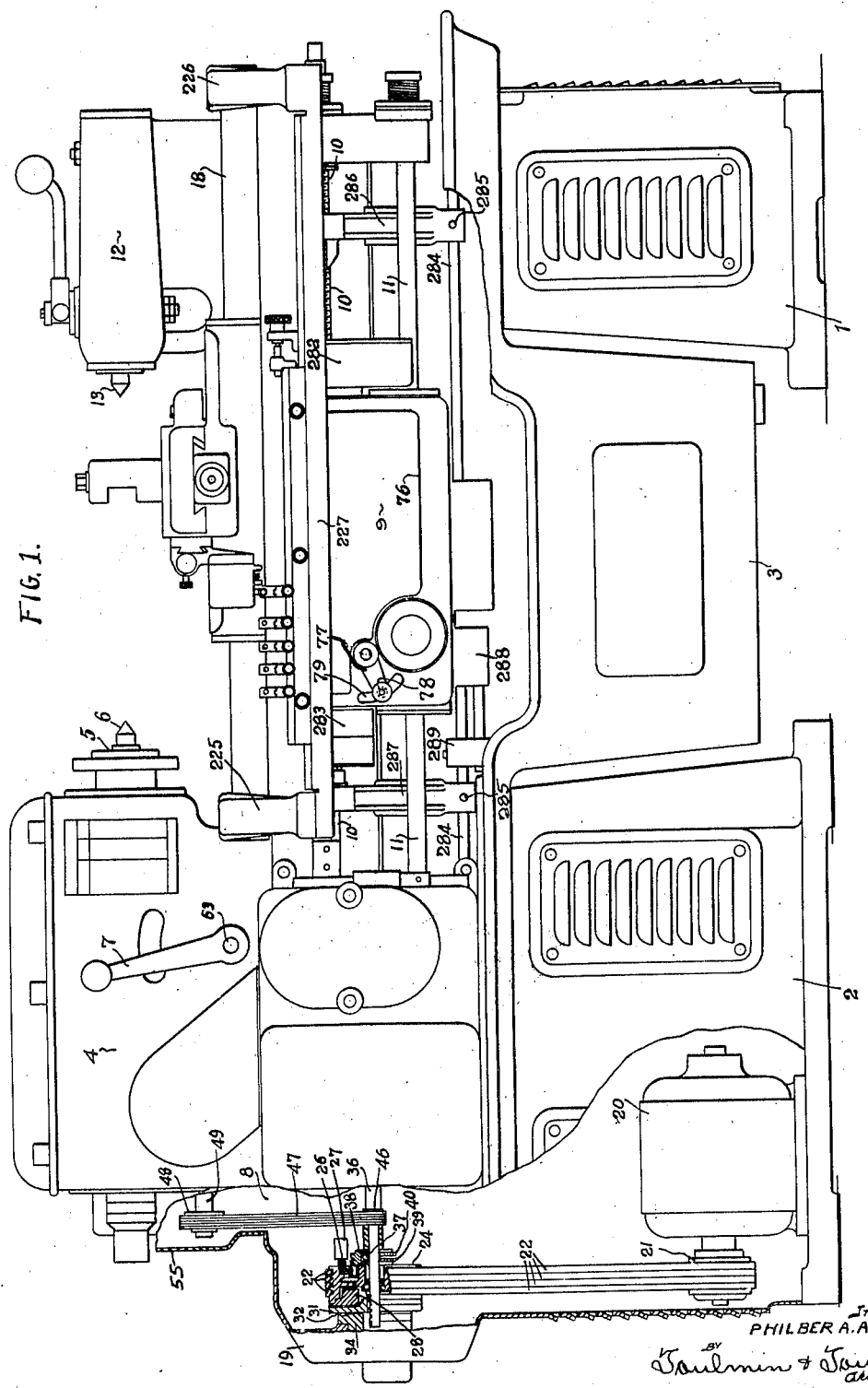
Figure 1 is a front elevation, partly broken away, of one type of lathe embodying my invention.
Figure 8:
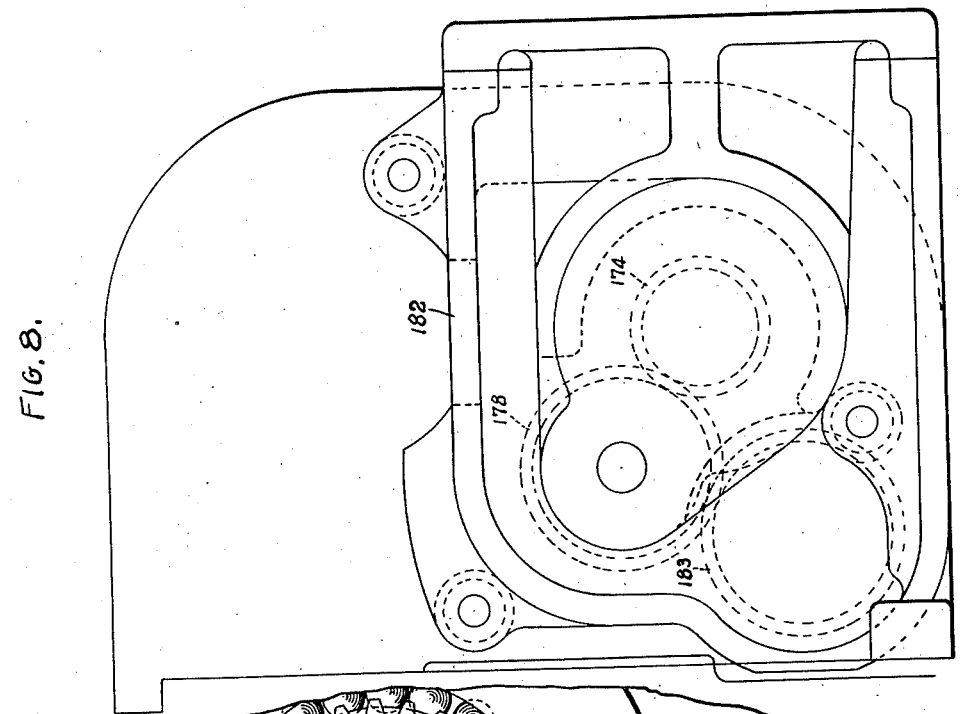
Figure 8 is a left-hand end elevation of a portion of the housing containing the mechanism shown in Figure 6.

Referring to the drawings in detail, Figure 1 shows this lathe as having hollow pedestals 1 and 2, arranged to support an intermediate pan 3 between them. These pedestals contain hollow louvers for ventilation of the interior. The lathe is provided with a head stock 4 having a live spindle 5 with a live center 6, the former serving to rotate the workpiece supported around the latter as a center. The interior of the head stock 4 is provided with change speed gearing actuated by the head stock gearing control lever 7. The lathe is likewise provided with a front gear box 8 containing gearing and clutches for the actuation of the front carriage 9 through the intermediate agencies of the front lead screw 10 and the front feed rod 11.

Arranged opposite to and in line with the head stock 4, with its live center 6, is the tail stock 12. The tail stock has a fixed or dead center 13, the point of which is in line with the live center 6. The details of the tail stock form no part of the present invention.

The lathe of my invention is likewise provided with a rear carriage 14 (Figure 2). A rear gear box 15 contains gearing and clutches adapted to actuate the rear carriage 14 through the intermediate agency of the rear feed rod 16. The lathe is also provided with a bed plate 18 having ribbed ways 17, along which the front carriage 9 reciprocates. The left-hand end of the machine adjacent the head stock 4 and front and rear gear boxes 8 and 15, respectively, is provided with clutch and brake mechanism contained within the clutch housing 19. Reversing mechanism within the apron 76 of the front carriage 9 is operated by the shaft 77 having the hand lever 78 working in the arcuate slot 79.

The pedestal 2 of the lathe contains the main driving motor 20 (Figure 1) having a multiple V-grooved pulley 21 engaged by V-belts 22, which engage the V-grooves 23 of the multiple V-grooved pulley 24 mounted in the interior of the clutch housing 19. Brushes 26 for the clutch magnet 28 fixed to the pulley 24 are mounted in the brush holder 27. The clutch magnet 28 is arranged to engage the front face of the intermediate disc 31. The opposite face of the latter is engaged by the braking ring 32 mounted upon the brake magnet 34, which is bolted to the clutch housing 19.

The intermediate disc 31 is keyed to the shaft 36 upon which are also mounted the inner races of the ball bearings 37, the outer races of which support the hub of the pulley 24 for free rotation. This hub carries a double sprocket 38 with sets of teeth forming sprocket portions 39 and 40. The sprocket portion 39 drives the sprocket 42, operating one end of the rear gear box 15 (Figures 1 and 9), whereas the sprocket portion 40 drives the sprocket 44, operating one end of the front gear box 8 (Figures 1 and 6).

The head stock 4 contains various gearing appropriate to the operation of the live spindle 5, the details of which form no part of the present invention. Certain portions of this head stock gearing, however, serve to transmit power from the main driving mechanism to the opposite ends of the front and rear gear boxes from the ends driven by the sprockets 44 and 42, previously mentioned. This portion of the mechanism is shown in Figure 10.

Figure 10:
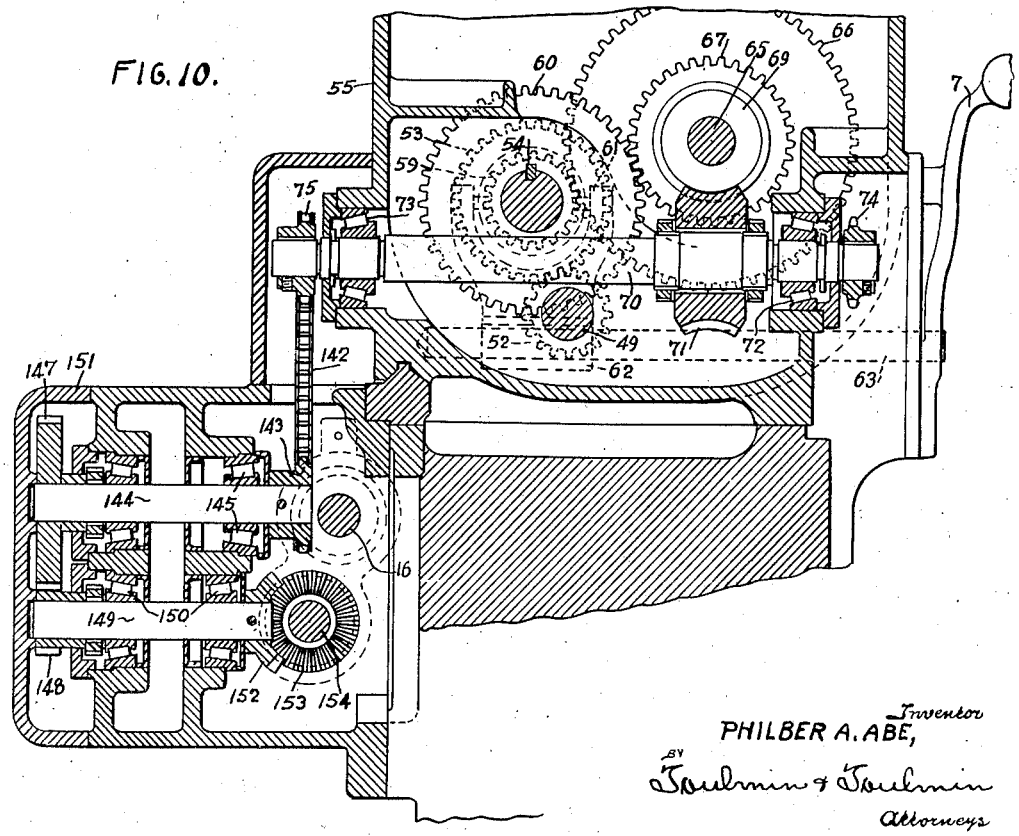
Figure 10 is a section along the line 10—10 of Figure 2, illustrating the rear gear box mechanism shown in Figure 9.

The shaft 36, on which the pulley 24 is loosely mounted, as previously described, likewise carries the triple sprocket 46 (Figure 1), driving the chain 47 which transmits power to the spindle sprocket 48 mounted upon the first intermediate shaft 49 (Figures 1 and 10). The first intermediate shaft 49 carries the pick-off pinion 52, which meshes with the pick-off gear 53 on the second intermediate shaft 54, these gears being contained within the pick-off gear casing 55 (Figures 1 and 2). The second intermediate shaft 54 is provided with a fixed key 58, upon which a pinion 59 is slidably mounted. This pinion 59 is formed integral with a gear 60, the whole being moved simultaneously by a shifter 61 engaged by the gear shifting yoke 62. The yoke 62 is mounted upon the shaft 63, the latter being operated by the head stock control lever 7, likewise mounted upon this shaft and located outside the casing (Figures 1 and 10).

The sliding pinion 59 (Figure 10) at one end of its travel, meshes with the gear 66 keyed to the live spindle shaft 5, whereas the gear 60, integral with the pinion 59, meshes with the pinion 67 at the opposite end of this travel. The pinion 67 is likewise keyed to the live spindle shaft 5. The live shaft 5 carries a worm 69 (Figure 10), which meshes with a worm gear 71 keyed to the cross shaft 70 which extends across the lathe. The front end of the cross shaft 70 carries a sprocket 74, which operates the mechanism driving the end of the front gear box 8 opposite the end which is driven by the sprocket 44, previously mentioned. The rear end of the cross shaft 70 carries a sprocket 75 which drives mechanism operating the end of the rear gear box 15 opposite to the end driven by the sprocket 42, previously mentioned. The cross shaft 70 is supported at its opposite ends upon anti-friction bearings 72 and 73 (Figure 10). The remainder of the mechanism shown in Figure 10 and contained in the rear gear box 15 will be described in connection with that gear box.

*Front gear box*

The front gear box 8 (Figure 6) contains an assembly of clutches and gears divided roughly into two groups. The group on the left-hand side of the front gear box is driven by the sprocket 44, which receives power from the sprocket portion 40. The right-hand side of the front gear box mechanism is driven by the sprocket 74 on the cross shaft 70 through intermediate mechanism, not shown. The left-hand side of the mechanism in the front gear box (Figure 6) contains clutches and gearing arranged to give a rapid traverse speed to the front feed rod and front lead screw, whereas the right-hand side of this mechanism is arranged to give a feeding speed to the same elements. The details of this mechanism form no part of the present invention, except as they are included in combination with the other elements of the machine, and a complete disclosure thereof may be found in the co-pending application of Clifford A. Bickel, Ser. No. 656,173. This application describes this mechanism in detail, excepting the mechanism shown in the lower left-hand corner of Figure 6.

The front gear box 15 (Figure 6) is provided with the longitudinal shaft 90 and the cross feed shaft 95. The shaft 90 carries a gear (not shown) meshing with a gear (not shown) upon the shaft 95. These gears are similar to the gears 115 and 116, described below, and have equal numbers of teeth so that the shafts 90 and 95 are interconnected to rotate at the same speeds, but in opposite directions. The longitudinal feed shaft 90, as previously stated, is driven by interconnecting mechanism from the sprocket 74 (Figure 10).

The longitudinal feed shaft 90 carries the front left feed magnet 110, which is provided with an armature plate 103 mounted upon a head 101 (Figure 6), the latter being mounted upon the armature shaft 102. Keyed to one end of the armature shaft 102 is a pinion 104, which meshes with a gear 105 mounted upon the lead screw jackshaft 106, the latter being directly connected to the lead screw 10 and supported by anti-friction bearings 107 mounted in the front gear box casing.

The pinion 104 is keyed at its opposite end to the armature shaft 109, carrying the armature plate 111 for the front right rapid traverse magnet 113 mounted on the rapid traverse longitudinal shaft 112 (Figure 6). The rapid traverse longitudinal shaft magnet 113 carries a collector ring 117, which is engaged by the brushes 118 and 119. The rapid traverse longitudinal shaft 112 is driven by the sprocket 44 thereon, and is rotatably mounted in the anti-friction bearings 114. The shaft 112 also carries a gear 115, which meshes with the gear 116 mounted upon the rapid traverse tool slide shaft 120. The latter is mounted in spaced anti-friction bearings 121. The gears 115 and 116 are similar in form and arrangement to the gears previously described (but not shown), which drivingly interconnect the longitudinal feed shaft 90 and the cross feed shaft 95.

The rapid traverse tool slide shaft 120 carries the front-out rapid traverse magnet 122. The latter is provided with a collector ring 123 engaged by brushes 124 and 125, and is arranged to be engaged by the armature plate 126 mounted upon the armature shaft 127. The pinion 129 is keyed to one end of the armature shaft 127 and meshes with the gear 130, mounted upon the front feed rod jackshaft 131. The latter drives the front feed rod 11, shown in Figure 1. The pinion 129 is also keyed at its opposite end to one end of the armature shaft 134, the opposite end of which carries the armature plate 136. The armature plate 136 is arranged to engage the front-in feed magnet 128, mounted upon the cross feed shaft 95.

The pinions 104 and 129, together with the armature shafts to which they are keyed, are mounted in ball bearings 140 located in the partition wall 141 of the front gear box casing. Accordingly, when none of the clutch magnets 110, 113, 122 or 128 is energized the pinions 104 and 129 can be loosely rotated in their bearings 140 by turning the front-lead screw jackshaft 106 and the front feed rod jackshaft 131, respectively. When one of these magnets is energized, however, the shaft upon which it is mounted is placed in direct driving relationship with the armature shaft and pinion with which it is associated.

The tool slide rapid traverse shaft 120 is tubular in form and extends outward through the front gear box casing into the auxiliary housing 182. The mechanism contained within this auxiliary housing 182 is new, and not shown in the previously mentioned Bickel applications, Ser. Nos. 656,173 and 694,501. Mounted on the outer end of the rapid traverse tool slide shaft 120 and within the auxiliary housing 182 is the front-in rapid traverse clutch magnet 167. The latter is secured to the former by means of the screw and collar mechanism, generally designated 171. The front-in rapid traverse magnet 167 is provided with a collector ring 168, engaged by brushes 169 and 170 for providing the clutch magnet with electric current.

Figure 7:
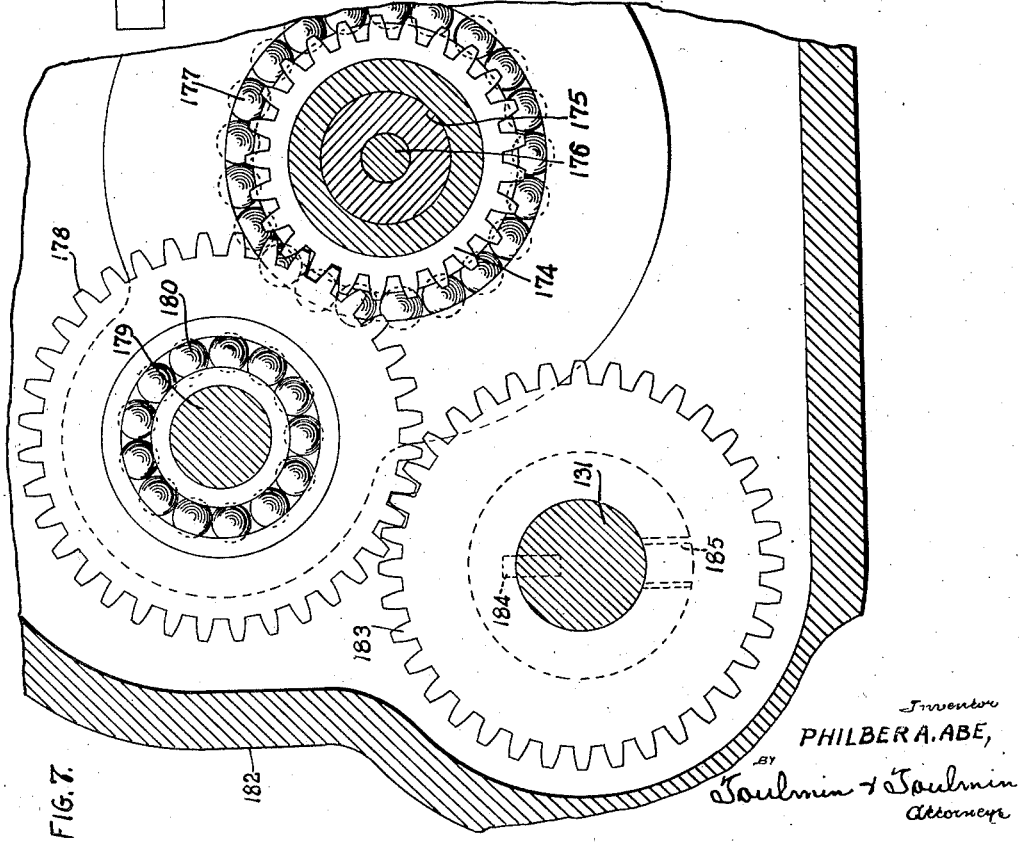
Figure 7 is a section along the line 7—7 of Figure 6, but showing the parts in their true position.

Arranged opposite the front-in rapid traverse clutch magnet is its armature plate 172, this being secured to the armature shaft 173 to which the pinion 174 is secured by means of the plug 175 and screw 176, arranged within its hub. The pinion 174 and the armature shaft 173 are rotatably supported by anti-friction bearings 177. The pinion 174 meshes with the teeth of the idler gear 178. The latter is loosely mounted upon the stub shaft 179 by means of the anti-friction bearings 180 arranged therebetween. The stub shaft 179 is supported in the casing portions 181. The idler gear 178 meshes with the gear 183 secured to an extension of the front feed rod jackshaft 131 by means of the key 184 and set screw 185 (Figures 6 and 7). In this connection, it should be recalled that Figure 7 shows the gears in their correct relationship, whereas Figure 6 is a layout or developed section, wherein the gears and shafts are laid out side by side for convenience of showing. The left end of the feed rod jackshaft 131 is rotatably mounted in anti-friction bearings 186, these elements being covered by the cover plate 187 attached to the auxiliary housing 182 (Figure 6).

*Rear gear box*

Figure 9:
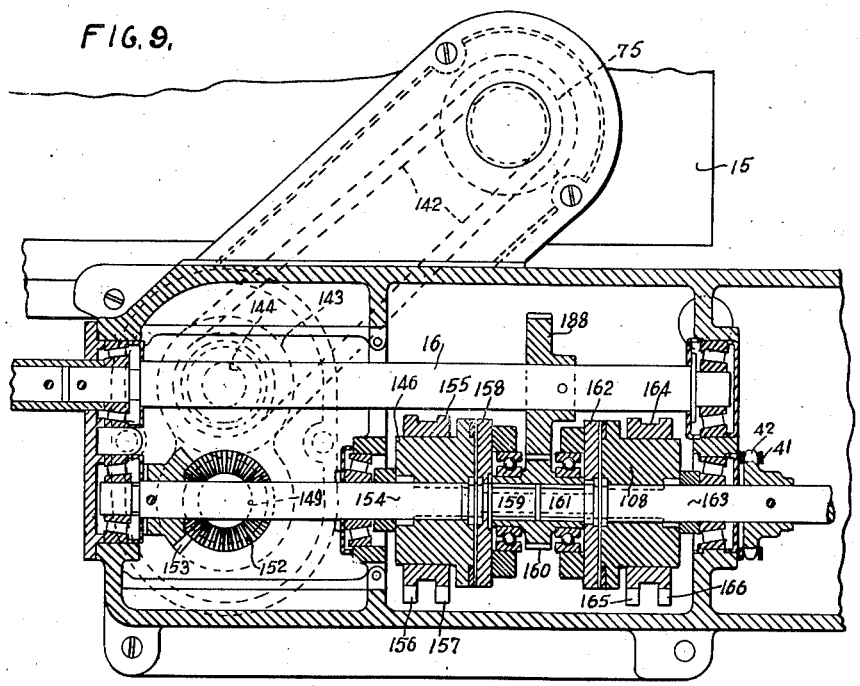
Figure 9 is a section along the line 9—9 of Figure 2, showing the rear gear box mechanism for operating the rear carriage feed rod.

The rear gear box 15 (Figures 9 and 10) receives power from the sprocket 75 on the cross shaft 70 through the intermediate agency of the chain 142, driving the sprocket 143 on the shaft 144 (Figure 10). The shaft 144 is mounted in anti-friction bearings 145 and carries the pick-off gear 147 meshing with the pick-off pinion 148 on the shaft 149 within the removable pick-off housing cover 151. The shaft 149 is mounted in anti-friction bearings 150 and carries a bevel pinion 152 meshing with the bevel pinion 153 on the cross feed-in shaft 154 (Figure 9). The latter carries the cross feed-in magnet 146 having the collector ring 155 engaged by the brushes 156 and 157. Associated with the cross feed-in magnet 146 is an armature plate 158 mounted upon the armature shaft 159, to which is keyed the pinion 160. The latter is keyed at its opposite end to the armature shaft 161, carrying the armature plate 162. Associated with the armature plate 162 is the cross feed rapid traverse out magnet 108, mounted upon the cross feed traverse out shaft 163. Mounted on this shaft is the sprocket 42, which is driven by the chain 41 from the sprocket portion 39 of the sprocket 38 (Figure 1). The clutch magnet 108 has a collector ring 164 which is engaged by the brushes 165 and 166 for the purpose of conveying current to and from this magnet.

The pinion 160, mounted upon the armature shafts 159 and 161, meshes with the gear 188 mounted upon the rear carriage feed rod 16. The shaft 163 is therefore driven at a speed suitable to impart a feeding speed to the rear feed rod 16, whereas the shaft 154 is driven at a speed suitable for rapidly traversing the rear carriage by means of the rear feed rod 16.

*Front carriage mechanism*

The details of the mechanism by which the front carriage 9 (Figure 5) is moved to and fro along its ways by means of the front lead screw 10 form no part of the present invention, and consist of the usual nut (not shown) mounted upon the carriage and meshing with the lead screw 10. Similarly, mechanism by which the power is taken from the front feed rod 11 and transmitted to the front tool slide screw shaft 190 also forms no part of the present invention. The details of such mechanism may be found in the previously mentioned Bickel applications, Ser. Nos. 656,173 and 694,501. The front tool slide screw shaft 190 carries a sprocket 191 which is driven by the sprocket chain 192 from the carriage mechanism interconnecting the front feed rod 11 with the front tool slide screw shaft 190.

The mechanism by which the direction of rotation of the screw shaft 190 is controlled is contained within the apron 76 of the front carriage 9, and controlled by the apron lever 77 having its end pin 78 operating in the arcuate slot 79 in the usual manner. The front carriage screw shaft is mounted in anti-friction bearings 193 with the collar 194 arranged therebetween. The nut 195 holds the sprocket 191, bearings 193 and collar 194 in correct spaced relationship with one another along the screw shaft 190.

The front tool slide screw shaft 190 is provided with a threaded portion 196, engaging the tool slide nut, generally designated 197. The details of this nut likewise form no part of the present invention. The nut 197 is secured to the front tool slide 198 by means of the screws 199. The front tool slide 198 is provided with a slotted portion 200, which receives the head 201 of the clamping bolt 202, arranged to clamp the tool block 203 in position upon the tool slide 198. The tool block 203 is provided with an aperture 204 which receives the tool 205. The latter is clamped in position by the tool clamping bolts 206. Consequently, when the sprocket 199 is rotated by means of the drive chain 192, the tool slide 198 will move in or out, depending upon the direction of rotation of the front tool slide screw shaft 190.

*Front carriage limit switch and stop arrangement*

To the side of the tool slide 198 is attached an arm 207 (Figure 3), which is provided with a dovetail guide rib 208. Arranged with a corresponding groove 209 engaging this guide rib 208 is a switch-supporting bracket 210 (Figures 3, 4 and 5). This switch-supporting bracket 210 is provided with a screw shaft 211, operated by the knurled head 212 and having a nut (not shown) secured at its opposite end to the arm 207. Consequently, the switch bracket 210 may be moved in or out with respect to the tool slide 198 by turning the knurled head 212. The arm may be locked in any desired position by turning the knurled head set screw 213.

The switch-supporting bracket 210 extends downwardly and forwardly (Figures 3 and 5), and carries on its forward end the front left-out limit switch 214, having a movable member 215 pivoted at 216 and provided with a spring 217 urging its fixed and movable contacts into engagement. The lower end of the arm 215 projects downwardly in a position adapted to engage the forward ends of the movable portions of micrometer stops 218, in a manner described below.

The switch bracket 210 also carries the diameter limit switch 219 (Figures 4 and 5) in a position immediately behind the front left-out limit switch 214. The fixed contact of this switch is carried on the bracket 210, whereas the switch arm 220 thereof is pivotally mounted thereon, as at 221 (Figure 5). The lower end of the switch arm 220 has a pivotally mounted contact finger 220a arranged to engage the ends of the knurled micrometer stop heads 218 and to yieldably slide thereover during the return of the carriage by the action of the flat spring 220b (Figure 5B). The fixed contact of the diameter limit switch 219 is mounted upon a threaded plunger having a spring 222 therearound (Figure 5A), and adjusted in its position by the nuts 223. A spring 224 urges the switch arm 220 in a direction opposite to the action of its lower end in encountering the movable portion of the micrometer 218.

Secured to the bed plate 18 of the lathe (Figures 1 and 3), at opposite ends thereof, are the brackets 225 and 226. These extend forwardly and serve to hold the stop support 227 in a position spaced below the tool slide 198 and in front of the apron of the front carriage 9. The stop support is provided with a guide ridge 228 upon which rests the stop holder 229, the latter having a grooved guideway 230 (Figure 5) corresponding in configuration to and engaging the guide ridge 228.

One end of the stop holder 229 is provided with a projection 231, having a threaded aperture engaged by a knurled headed screw 232, the latter being rotatably mounted in an L-shaped arm 233 secured to the stop support 227. The stop holder 229 is provided at intervals with knurled headed screws 234, by which the holder 229 may be locked in any position upon the support 227. By loosening the knurled screws 234 and turning the knurled headed screw 232 the stop holder 229 may be moved to and fro along the stop support 227. The screw 232 is a micrometer screw and the barrel 235 of the knurled headed screw 232 is graduated so that the extent of motion of the stop support 227 can be accurately measured.

The stop holder 229 on its upper surface is provided with a dove-tail guide ridge 236. The micrometer stops 218 have bases 237 with corresponding grooves 238 engaging the guide ridge 236 and clamped thereto by the clamp screws 239. Secured to each stop base 237, as by the knurled headed screws 240, is an L-shaped arm 241 (Figure 5). Mounted in this arm is the graduated barrel 242 of the micrometer stop. The micrometer screw 243 thereof passes through the barrel 242 and the arm 241, and is rotated by means of the knurled head 244.

The top of the guide ridge 236 is provided with a graduated scale 245, whereby the micrometer stops 218 may be accurately positioned along the stop holder 229. By loosening the clamping screws 239 the stops 218 may be moved along the scale 245 and reclamped in any desired position. By rotating the knurled micrometer head 244 on each stop 218 the front end of the screw 243 and the back end of the head 244 may be placed in any desired position, such as shown in Figure 4. In this figure five micrometer stops 218 are shown with their heads 244 in different relative positions so as to cause the cutting tool 10 to cut stepped portions upon a workpiece.

These micrometer stops 218 do not determine the initial and final positions of the carriage, nor do the switches 214 and 219, actuated by these stops. The control of the inner and outer limits to which the tool slide 198 will move is exercised by a front tool slide stop assembly 246, secured to the opposite side of the tool slide 198 from the arm 207 (Figures 3 and 4). The details of this stop system are shown in Figures 11 and 12.

The front tool slide stop assembly 246 is secured to the side portion 247 of the front tool slide 198, upon one end of which portion 247 is mounted an L-shaped arm 248, as by the bolt 249. The arm 248 is provided with a forwardly extending stop 250. Similarly, the forward end of the tool slide portion 247 is provided with another L-shaped arm 251, secured thereto as by the bolt 252, and having a stop 253 projecting rearwardly therefrom. The stop 253 (Figure 12) is mounted on a micrometer screw (not shown) within the graduated barrel 254, this barrel being secured to the L-shaped arm 251. By rotating the stop 253 the outer end thereof may be positioned at an accurate and predetermined distance from the arm 251. The scale 255 cooperates with the micrometer stop 253 in assisting in the accurate positioning of the stop 253.

The tool slide 198 is provided with a slot 256 (Figure 11), which serves to receive the heads 257 of the bolts 249 and 252, adjustably securing the L-shaped arms 248 and 251 of the stop assembly 246 to the side portion 247 of the tool slide 198. A cover plate 258 (Figure 11) protects the stop assembly 246 from damage, either by falling bodies or by grit or other injurious materials.

The stops 250 and 253 are arranged to engage the ends respectively of push rods 259 and 260. The push rods 259 and 260 extend downwardly through the bores 261 in the collar 262, and are urged upwardly by the coil springs 263 mounted in the lower ends of the bores 261. The lower ends of the push rods 259 and 260, respectively, engage the movable arms 264 and 265 of the front-out limit switch 266 and front-in limit switch 267, respectively, (Figure 11). The switch arms 264 and 265 are pivotally mounted, as at 268, upon their base portions 269 and 270, respectively.

The base portion 269 is provided with fixed contact 271, cooperating with the movable contact 272 upon its switch arm 264. Similarly, the base portion 270 is provided with the fixed contact 273, cooperating with the movable contact 274 upon its switch arm 265. The movable contact 274 is mounted upon the threaded rod 275, passing through the switch arm 265 and held in position by the nuts 276 (Figure 11). The switch arms 264 and 265 are urged into closed positions by the coil springs 277 and 278, respectively. A common base 279 serves to support the switches 266 and 267, and carries a projection 280 by which it, in turn, is secured to the front carriage 9 as by the screws 281. Thus it will be observed that the tool slide, at the extreme limit of its forward movement, will cause the stop 253 to depress the push rod 260 and actuate the front-in limit switch 267. On the backward stroke, however, the stop 250 will engage and depress the push rod 259, opening the front-out limit switch 266.

The motion of the front carriage 9 as a whole is determined by the front right limit switch 282 and the front left limit switch 283, respectively, on opposite ends of the front carriage 9. These switches are actuated by the limit switch stops 286 and 287, adjustably mounted upon the stop rod 284. The latter is supported by the bed plate 18 of the lathe. By moving the limit switch stops 286 and 287 along the rod 284, the points at which the carriage will stop in its reciprocation can be accurately predetermined, whereupon the limit switch stops 286 and 287 can be clamped in position by tightening the set screws 285. Also mounted upon the front carriage 9 is the rear carriage pick-up switch 288, operated by the pick-up switch stop 289. The latter is also adjustably mounted upon the rod 284.

The front tool 205 may be set in a predetermined position by means of the micrometer tool setting gauge 290 (Figure 4). This tool setting gauge 290 has been described and claimed in the copending application of Clifford A. Bickel, Ser. No. 23,887. The use of this gauge enables the setting of the tool 205 at a predetermined position relative to the axis of rotation of the workpiece, and without the need for "cut-and-try" operations. It will be observed that the same micrometer gauge 290 may be used for setting the position of the rear carriage tool, and is so shown in Figure 4. The micrometer gauge 290 is detachable from the machine and is removed after the tool is placed in its desired position.

The modified form of stop and switch assembly shown in Figures 13, 14, 15 and 16 is used to replace the previously-described stop and switch assembly 246, 266 and 267, when it is desired to cause the front tool 205 to rapid traverse inwardly to a predetermined position, and afterward to feed inwardly to another predetermined position. The purpose of this arrangement is to permit the tool to be moved rapidly toward the workpiece, yet to slow down to a feeding speed before the workpiece is encountered, thus saving time in the operation of the machine, yet obtaining as accurate a motion as if the tool had been moved inwardly at a feeding speed over the entire distance.

In multiple tool turning, where for convenience of loading and unloading the machine it is desirable to have the turning tools in the front carriage tool slide at a considerable distance from the work, much time would be lost if the tools moved toward the work at the regular feeding rate. Much of this time can be saved by having the tool move inward first at a rapid rate and afterward at a slow feeding rate.

The stop assembly, generally designated 300, shown in Figures 13 and 14, consists of a base 301 secured to the side of the tool slide 198 in the manner previously described in connection with Figure 11. The base 301 is similarly provided with an L-shaped arm 302 secured thereto by the knurled screw 303, and having the out limit stop 304 mounted thereon (Figure 13). This stop encounters and operates the push rod 259 in the manner previously described in connection with Figure 11, the push rod mechanism being identical with that previously described. The push rod 260 in this modification, however, is pushed downward to different depths at different stages of its motion. The forward end of the base 301 is provided with an L-shaped arm 305, clamped thereto by the knurled screw 306. This arm 305 is provided with a graduated micrometer screw barrel 307, secured thereto as at 308, and carrying in its interior a micrometer screw (not shown) attached to the knurled head 309. The latter is provided with graduations by which the extent of motion of the head 309 inward or outward may be determined.

The arm 305 has a downwardly extending portion 310, in which is mounted the rapid traverse stop 311, in the form of a rod. Slidably mounted on the rapid traverse stop 311 is the feed stop 312. This may be anchored in any desired position by tightening the clamp screw 313. The feed stop 312 is in the form of an L-shaped member having an upwardly projecting portion 314, in which is held a contact pin 315, as by the knurled set screw 316. The feed stop 312 is provided at its forward edge with a beveled contact portion 317.

The front-out limit switch used in connection with the front-out stop 304 may be of the same pattern as the front-out limit switch 266, previously described, as shown in Figure 11. The rapid traverse and in-feed switch, generally designated 318, (Figures 15 and 16) has a two-stage action operated by the push rod 260. The switch 318 consists of a base 319 arranged to support the fixed contacts 320 and 321, as on the threaded rod 322 held in position by the nuts 323. The movable contacts 324 and 325, however, are mounted as shown in Figures 15 and 16, in the outer end of a switch arm similar to the switch arm 265 of Figure 11, and pivotally supported in a similar manner, with a similar spring 278 urging the contacts 324 and 325 into engagement with the contacts 320 and 321, respectively.

The movable contact 325 is mounted upon the end of a screw shank 326, which passes through a bore 327 in the end of the switch arm 265 and is held in position thereon by the nuts 328. The movable contact 324, however, is similarly mounted upon a screw shank 329, with nuts 330 on the opposite end, but the distance between the nuts and the inner face of the contact 324 is greater than the thickness of the arm 265 at this point so that the assembly may be moved up and down slightly. The contact 324 is urged downwardly by the coil spring 331 mounted in the countersink 332 in the end of the switch arm 265.

In the operation of this switch and stop assembly (Figures 13 to 16, inclusive) the feed stop 312 is moved along the rapid traverse stop 311 and adjusted in position by bringing its contact pin 315 into engagement with the micrometer head 309 so that a predetermined distance separates the beveled contact portion 317 on the feed stop 312 from the beveled contact portion 333 on the end of the rapid traverse stop 311. This separation determines the distance through which the tool will move at a feeding rate after its rapid traverse movement has ceased.

As the tool slide 198 moves inward and the tool 205 accordingly moves toward the workpiece at a rapid traverse speed, both switches being in the closed position shown in Figure 16, the beveled contact portion 333 of the rapid traverse stop 311 will encounter first the push rod 260, pushing it downward. This action will cause the outer end of the switch arm 265 to be raised slightly, causing the movable contact 325 to be separated from the fixed contact 321, breaking the circuit, as shown in Figure 15. At the same time, however, the coil spring 331 will maintain the movable contact 324 in engagement with the fixed contact 320 so that the circuit remains closed. By the electrical arrangements described below this action causes the rapid traverse motion of the tool slide 198 to cease and the slower feeding motion thereof to commence.

The front tool 205 feeds inwardly through the distance equal to the separation of the bevel portions 333 and 317, with the lower side 334 of the rapid traverse stop holding the push rod 260 in its partly depressed position. The bevel portion 317 on the feed stop 312 now engages the push rod 260 (Figure 14) and pushes it downward by a further amount so that the movable contact 324 separates from the fixed contact 320. This action breaks the circuit and causes the inward feeding motion of the tool to cease, and the longitudinal feeding to commence according to the arrangements described below.

Rear carriage mechanism

The mechanism by which the rear carriage 14 is actuated may be of any conventional type, and accordingly requires no detailed description. Mechanism for this purpose has been disclosed in detail in the copending Bickel applications, Ser. Nos. 656,173 and 694,501.

The rear carriage 14 (Figures 4 and 5) is actuated by the rear carriage feed rod 16, which is controlled by the magnetic clutches 108 and 146, described in connection with Figure 9. The rear carriage 14 may be moved to and fro along the guideways 17 until it is located at any desired position on the bed-plate 18 of the lathe, at which position it may be locked by means of the clamping bolts 335 (Figure 5), having the heads 336 engaging the under sides of the guideways on the lathe bed. The rear carriage is provided with a tool slide 340, which is actuated inward and outward with respect to the workpiece by means of a screw shaft and nut mechanism, similar to that described in connection with the front carriage, and operated through suitable mechanism from the rear feed rod 16.

The rear tool slide 340 is provided with a slot 341 which serves to receive a correspondingly configured portion 342 of the tool post base 343, the upper portion of which carries a dove-tail rib 344 engaging a dove-tail slot 345 in the rear tool post 346. The latter is provided with a recess or aperture 347, which serves to receive the rear tool 348, this being clamped in position therein by means of the clamping screws 349 (Figure 5).

Rear carriage stop and switch arrangement

To one side of the rear tool slide 340 is secured the arm 350, in a manner similar to that of the corresponding arm 207 of the front tool slide 198. On the rearward end of the arm 350 is adjustably mounted the L-shaped arm 351, as by the bolt 352. The lower end of the bolt 352 is received within the slot 353, whereby the arm 351 may be moved to and fro along the slot 353 (Figure 17). The scale 354 assists the operator in positioning the arm 351, with the aid of the index marker 355 upon the arm 351 (Figure 4). Mounted in the arm 351, as by the aid of the member 356, is the graduated barrel 357, containing a micrometer screw (not shown) having the knurled head 358. The micrometer head 358 serves as the rear-in stop of the lathe, and is arranged in such a position as to engage the push rod 359 of the rear-in switch 360 (not shown). This switch is identical in construction, however, with the switch 267 shown in Figure 11.

The arm 350 also carries a second L-shaped arm 361 adjustably mounted in the slot 353 with the aid of the clamping bolt 362, in a manner similar to that of the arm 351, previously described. The arm 361 is likewise L-shaped (Figures 4 and 17), and similarly carries the fixed or rear-out limit stop 363. The latter is so positioned as to engage the push rod 364, which in turn, actuates the rear-out limit switch 365 (not shown). This switch is also identical in construction with the limit switch 266, shown in Figure 11.

In the operation of the limit switch and stop arrangement shown in Figures 4 and 17, the rear carriage moves inwardly until the micrometer head 358 encounters and depresses the push rod 359, opening the limit switch 360. According to the electrical operation subsequently described, this action causes the rear carriage tool slide 340 to reverse its motion and move outwardly after a predetermined time lag. At the end of this outward motion the rear-out limit stop 363 encounters and depresses the push rod 364, opening the rear-out limit switch 365 and stopping the motion of the rear tool slide 340.

Electrical control switchboard

The switchboard 370, by which the various electrical apparatus of the machine may be manually or automatically controlled, is shown in Figures 21 to 24, inclusive. These switches are arranged according to the circuits shown in Figures 29 to 31, inclusive. The switches and instruments included upon the switchboard are shown within the dotted line 371 in Figures 29 to 31, inclusive.

In the middle and at the top of the switchboard 370 is mounted the pilot light 372 (Figure 23), immediately behind the ruby glass lens 373. On the level below this is arranged, from left to right, the voltmeter 374, the front left switch 375, the front-in switch 376, the rear-in switch 377 and the spindle control switch 378. An additional switch, actuated by the same knob as the spindle control switch 378 and designated as the "inch-right" switch 379, is mounted adjacent the spindle control switch 378 and is operated by turning the knob of the switch 378 into an additional position.

On the middle level of the switchboard 370 are arranged the switches comprising the feed control switch 380, the feed-in switch 381, the feed-out switch 382 and the auxiliary motor control switch 383. On the lower level of the switchboard 370 are arranged the switches comprising the reverse switch 384, the motor control switch 385 and the start switch 386. Also arranged on the middle level of the switchboard 370 is an indicator 387, arranged to show the position at which the apron lever 77 of the front carriage apron 76 should be set in order to properly employ the feed-out switch 382 and feed-in switch 381, respectively.

The interior arrangements of these switches on the switchboard 370 are shown in Figures 22 to 28, inclusive. This showing is made to clarify the disclosure of the use of these switches in connection with the wiring diagrams 29, 30 and 31.

Electrical apparatus

The present invention is disclosed in the three circuits shown in Figures 29, 30 and 31, which will be subsequently referred to, for convenience, as the first, second and third circuits, respectively. These three circuits are fundamentally similar, differing only in certain details.

In all circuits the frame of the machine serves as the ground connection for the passage of the negative electric current. Consequently, the first and second circuits contain the following magnetic clutches, namely, the front-in clutch 128, the front-left clutch 110, the front-out clutch 122, the front-right clutch 113, the rear-in clutch 146, the rear-out clutch 108, the main clutch 28 and the main brake 34. The third circuit (Figure 31) contains all of these, plus an additional front-in rapid traverse clutch 167. One pole of each of these clutches is grounded to the frame of the machine, the other pole being energized selectively according to the arrangements subsequently to be described.

The first circuit (Figure 29) contains the following limit switches, operated by the motions of the front and rear carriages: The front-in switch 267, the front-out switch 266, the front-right switch 282, the front-left switch 283, the front left-out switch 214, the diameter switch 219, the front-in traverse switch 318, the rear-out switch 365, the rear-in switch 360 and the rear carriage pick-up switch 288.

The second circuit (Figure 30) is somewhat more simplified than the first circuit and omits the front left-out limit switch 214 and the diameter limit switch 219.

The third circuit (Figure 31) likewise omits the same two limit switches 214 and 219 as in the second circuit (Figure 30), but in addition to this, employs the front-in traverse switch 318.

All three circuits contain substantially the same switchboard switches 375 to 386, inclusive, and to these the third circuit adds a manually operated switch, designated as the front-in traverse switch 391.

All three circuits likewise contain substantially the same relays, with somewhat different connections thereof in the second and third circuits. These relays are as follows, as shown in Figures 29, 30 and 31: Left-hand corner—time relay 389. Top row—front-in left relay 392; double-pole relay 393 and the front-out relay 394; second row—the split relay 395; pump relay 396; rear-in relay 397; brake and clutch relay 398; cycle starting relay 399 and the double-pole relay 400. To these relays the third circuit (Figure 31) adds the front-in traverse relay 401.

All three circuits receive energy for substantially all of the electrical apparatus from a single-voltage current, generated by the direct current generator 402, driven by the alternating current motor 403. The direct current generator 402 is preferably of the 24-volt type. The main driving motor 20 and the auxiliary driving motor for the oil pump (not shown), however, are operated by alternating current. It will be emphasized, however, that the feeding operations of the front and rear carriages, together with the various traverse operations, take place by this single-voltage direct current only. The use of a single-voltage current greatly simplifies the construction of the machine, increases its efficiency and reduces both the cost of construction and operation.

The arrangement of the various wiring lines connecting the different pieces of electrical apparatus is best discussed in connection with the operation, because the destinations of these lines are self-evident from the wiring diagrams.

In each of the three circuits the first half of the operating cycle is different from that of the others. In all three circuits, however, the final half of the operating cycle is substantially the same.

Electrical set-up operations—All circuits

Figure 29:
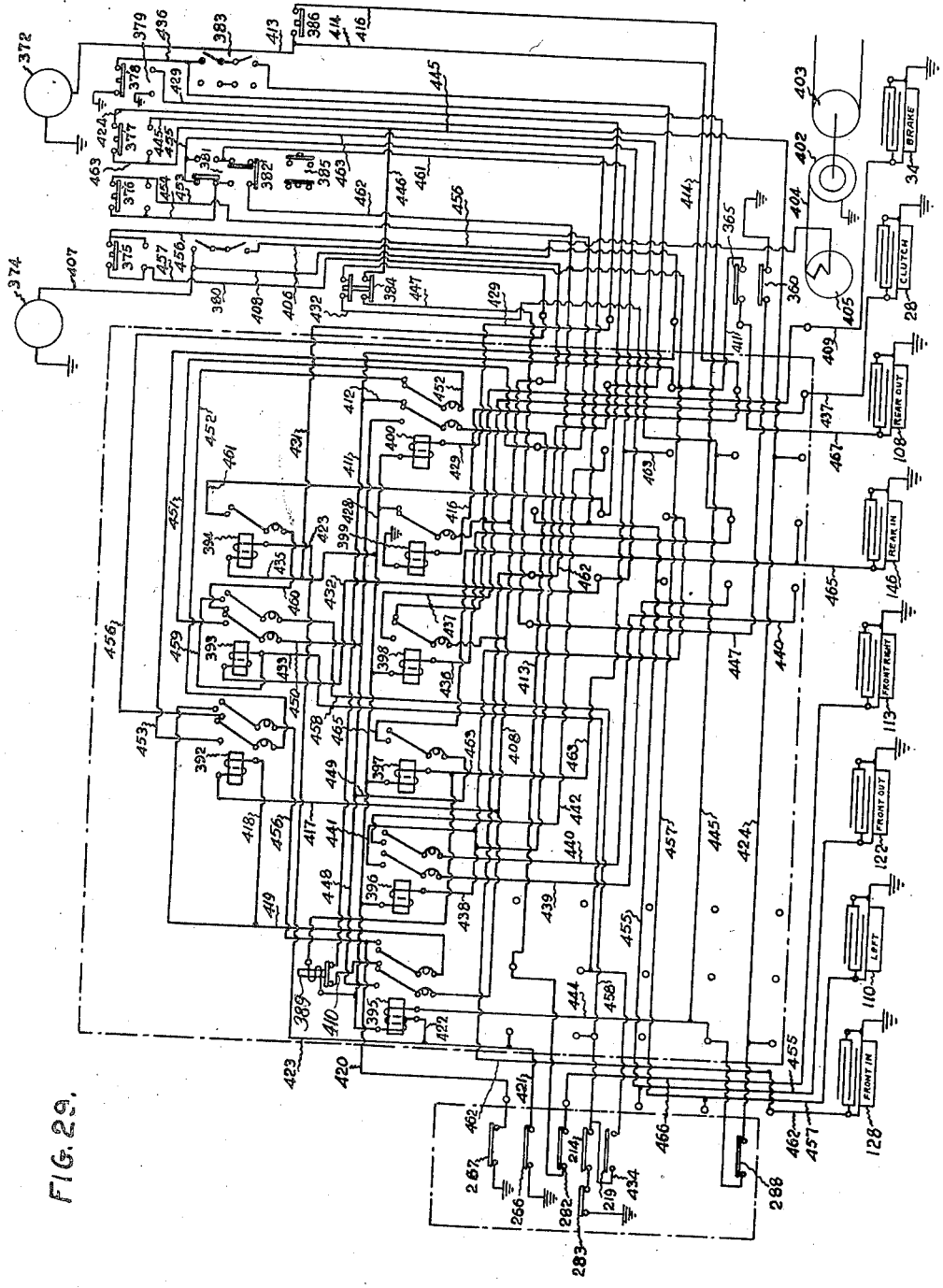
Figure 29 is a wiring diagram showing the electrical circuits in one embodiment of my invention.

The wiring diagram for the first circuit is shown in Figure 29. In this circuit the apparatus is especially arranged for the cutting of stepped workpieces having portions of different diameters. This circuit, therefore, employs the micrometer stops 218, together with the front left-out limit switch 214 and the diameter switch 219 operated by them. In the cycle of operation for the first circuit (Figure 18) the front cutting tool moves inward at a rapid traverse speed until it reaches a predetermined point, then feeds leftward until it reaches another predetermined point, then feeds alternately outward and leftward until it reaches another predetermined point, where the front carriage temporarily halts. Meanwhile, the rear carriage has come into operation, and the rear tool has moved forward at a feeding speed until it reaches a predetermined point, whereupon it reverses its motion and returns to the starting point at a rapid traverse speed. As it reverses its motion the temporarily halted front carriage resumes its motion and moves back to the starting point at a rapid traverse speed. In the following discussion the word "traverse" is used to refer to this rapid traverse speed, as distinguished from the slower feeding speed.

In the operating cycle of the second circuit (Figures 19 and 30) the front tool feeds inward until it reaches a predetermined point, then feeds leftward to another predetermined point, then rapid traverses outward to a third predetermined point, where it halts temporarily while the rear tool feeds inward to a predetermined point. The front tool and rear tool then rapid traverse back to their starting positions.

In the operating cycle of the third circuit (Figures 20 and 21) the front tool rapid traverses inward to a predetermined intermediate point before reaching the workpiece, then feeds inward the remainder of the distance to another predetermined point, then feeds leftward to another predetermined point, and then feeds outward to still another predetermined point, where it halts temporarily, while the rear tool feeds inward and makes its cut. Both tools then rapid traverse backward to their starting positions.

To accomplish the cycle of operations for any of the three circuits the operator performs a series of set-up operations. He first closes the feed control switch 380. This starts the motor generator 402—403 in operation, causing direct current to proceed by the line 404 to and through the fuse 405 (Figure 29), thence by the line 406 to and through the feed control switch 380, where a portion of the current proceeds by the branch line 407 to and through the voltmeter 374 to the ground. The remainder of the current proceeds from the feed control switch 380, along the line 408 to the blade terminal of the relay 399, the blade terminal of the brake and clutch relay 398, thence across this switch blade and through the line 409 to the main brake magnet 34, energizing it and applying the brake to the main shaft 36 of the main driving mechanism.

From the blade terminal of the brake and clutch relay 398 the current continues along the line 408 to the left-hand blade terminal of the split relay 395. The latter is not yet energized, hence, the current proceeds over the left-hand blade thereof and the line 410, to and through the blade of the time relay 389, through the line 411 and the branch line 412 to the left-hand blade contact of the relay 400. Since this relay is not yet energized the circuit is open through the left-hand blade thereof, and along the line 413 to one side of the front right limit switch 282. This switch, however, is open when the front carriage or front cutting tool is in its starting position, hence, no current flows at the outset.

Beyond the relay 400 and past the branch line 412 the current continues by the line 411 to one side of the rear-out switch 365. This switch, however, is also open when the front cutting tool is in its starting position. From the point on the line 411, just prior to its reaching the rear-out switch 365, the branch line 414 proceeds to the start cycle switch 386, the branch line 413, continuing therebeyond to the pilot light 372 and the ground. From the opposite side of the start cycle switch 386 the line 416 proceeds to the coil terminal of the relay 399 and through the coil to the ground, energizing the relay 399 and opening the circuit across its blade.

From a point on the line 408 between the pump relay 396 and the rear-in relay 397 the branch line 417 proceeds to the coil terminal of the front-in left relay 392. Current from the line 408, through the branch line 417, now energizes the front-in left relay 392 by passing through its coil and over the lines 418 and 419 to and through the right-hand blade of the unenergized split relay 395, thence over the line 420 to and through the front-in limit switch 267 to the ground, this limit switch being closed at the start of the cycle. The front-out limit switch 266, however, is open at the start of the operating cycle, thus breaking the circuit in the lines 421 and 422 leading to the left-hand side of the coil of the split relay 395; and also opening the circuit in the line 423 leading to the coil terminal of the front-out relay 394. The split relay 395 and the front-out relay 394 therefore remain temporarily deenergized.

At the start of the operating cycle the rear pick-up limit switch 288 is also open, hence, breaking the circuit in the line 424, running therefrom to the rear-in switch 377. As will be seen below, while the front and rear tools move through their operating cycles these switches will automatically close, but will be opened again when the tool returns to its starting position.

In further preparing the machine for operation, the operator closes the auxiliary motor control switch 383 controlling the pump motor relay 396, the latter serving to transfer alternating current to the pump motor, as described below. The operator also closes the feed-out switch 382 to interconnect the right-hand vertical terminals, and at the same time, closes the feed-in switch 381 to interconnect its left-hand vertical terminals. He also throws the front-left switch 375, the front-in switch 376 and the rear-in switch 377 to their off positions so that no accident can occur while he is setting the various limit switches.

In adjusting the limit switches for the first circuit the operator positions the stop of the rear carriage pick-up switch 288 at its proper position along the bed of the machine, and also correctly positions the stops for the front-left limit switch 283, the front-left-out limit switch 214 and the diameter limit switch 219. The micrometer stops 218 are arranged with their micrometer screws in proper sequence and at proper separations so that the workpiece will be cut with portions of correct lengths and diameters. The stops of the front-in limit switch 267, the front-out limit switch 266, the front-right limit switch 282, the rear-in limit switch 360 and the rear-out limit switch 365 are likewise set at predetermined positions, according to the particular nature of the workpiece.

For the second circuit (Figure 30) the previously described machine set-up operations are identical with those of the first circuit (Figure 29), except that the front-left-out switch 214 and the diameter switch 219 are omitted, hence, the positioning of their stops is unnecessary. The micrometer stops 218 are likewise missing from the second circuit.

For the third circuit (Figure 31) the machine set-up operations are the same as for the second circuit described immediately above. In addition to these steps, the operator likewise closes the front-in traverse switch 391, the closing of the circuit from the motor generator 402 by way of the lines 404, 406, 408 and 417 to the coil terminal of the front-in-left relay 392 having been described in connection with the first circuit (Figure 29). From this coil terminal of the front-in-left relay 392 the circuit is now closed along the line 425 (Figure 35) to and through the coil of the front-in traverse relay 401, thence along the line 426, through the now closed front-in traverse switch 391, thence along the line 427 to and through the front-in traverse limit switch 318 to the ground. The latter switch is closed at the start of the operating cycle, hence, the front-in traverse relay 401 of the third circuit is energized during the machine set-up operations.

*Operating cycle—first circuit*

To start the operating cycle in the first circuit the operator depresses the start cycle switch 386 breaking the circuit between the lines 414 and 416, and hence, deenergizing the coil of the relay 399. This action closes the circuit between the now energized line 408, across the blade of the relay 399 to the line 428. This line leads to the coil of the relay 400, but does not close this relay because the circuit is open in the line 429 leading to the ground, through the now opened "inch-right" switch 379. The circuit is also closed between the now energized line 428, through the branch lines 430 and 431 to the reverse switch, thence by the line 432 to the coil terminal of the relay 393. This relay is now energized because current can pass through its coil by way of the line 433 to the diameter switch 219. This being closed at the start of the cycle, the current proceeds therethrough, over the line 434 and through the front-left-on switch 214 to the front-left switch 283 to the ground.

The circuit is also closed from the now energized line 428, through the branch lines 430 and 435 to the coil terminal of the front-out relay 394. This relay, however, stays open because its coil remains deenergized by the fact that the line 423 leading therefrom to the gorund must pass through the front-out switch 266, which is open at the start of the cycle.

Current from the line 428 also proceeds through the coil of the brake and clutch relay 398, along the line 436, to and through the now closed spindle control switch 378 to the ground, closing the brake and clutch relay 398, and shifting its switch blade to the left. This action deenergizes the line 409 from its connection with the energized line 408, across the switch blade of the relay 398, thereby deenegizing the brake magnet 34 and releasing the brake from the shaft 36 of the main driving mechanism. At the same time, however, the line 437 is now energized at the left-hand contact of the brake and clutch relay 398, through the switch blade thereof, thus energizing the main magnetic clutch 28 and applying the power from the main driving motor 20 to the shaft 36. If the motor control switch 385 has been closed by the operator the main driving motor 20 will now drive the shaft 36, and with it the remainder of the mechanism.

From the energized line 428 current also passes through the coil of the pump relay 396, thence along the line 438 to and through the now closed auxiliary motor control switch 383, and thence by the line 436 to the ground, across the now closed spindle control switch 378. This action energizes the pump relay 396 and causes its switch blades to close, thereby transmitting alternating current from the alternating current mains 439 and 440, across these switch blades to the lines 441 and 442 leading to the motor of the pump (not shown).

From the energized line 428 the current goes by the branch line 443 to the coil of the time relay 389. At the same time current also goes along the line 428 itself to and through the coil of the split relay 395, thence along the lines 444, 445 and 446, across the lower switch blade of the reverse switch 384, thence by the line 447 to and through the rear-in switch 360 to the ground, energizing the split relay 395. As the latter closes current can now pass from the energized line 408, across the left-hand switch blade of the split relay 395, through the lines 448 and 449 to the blade terminal of the rear-in relay 397; also by the branch line 450 to the left-hand blade terminal of the relay 393, thence across this blade through the line 451 to and through the right-hand blade of the deenergized relay 400, through the line 452 to and through the left-hand blade of the now closed front-in relay 392, thence by the line 453 to the front-in switch 376 on the switchboard.

The operator now shifts the front-in switch 376 to its "jog" position so that current goes through this switch by the line 454 to and through the switch blade of the feed-in switch 381, thence by the line 455 to the front-out magnetic clutch 122, energizing it. The connection of the feed-in switch 381 to its left-hand vertical terminals and of the feed-out switch 382 to its right-hand vertical terminals is the opposite of the positions of the same switches in the second and third circuits, as will subsequently appear. Due to this fact, and also to the fact that the operator has shifted the front carriage apron control lever 78 to reverse the gearing in the front carriage apron, the energization of the front-out magnetic clutch 122 causes the tool to move inward at a rapid traverse speed.

The tool traverses inward until the front-in limit switch 267 is opened by the movement of the cross slide, deenergizing the circuit including the line 420 leading to and through the right-hand blade of the split relay 395, and onward by the lines 419 and 418 to the coil terminal of the front-in-left relay 392. This action deenergizes the front-in-left relay 392. The current now goes from the energized line 408, through the left-hand blade of the now closed split relay 395, thence through the lines 448 and 450 to and through the left-hand blade of the now closed relay 393, along the line 451 to and through the right-hand blade of the now open relay 400, thence along the line 452 to and through the left-hand blade of the now open front-in-left relay 392 to and through the line 456 to the front-left switch 375 on the switchboard.

As the operator presses this switch to the "jog" position the current continues along the line 457 to the front-left magnetic clutch 110, closing it and causing the front tool to move to the left. The front tool moves to the left until the front-left-out switch 214 encounters the first micrometer stop 218 and opens. This deenergizes the circuit, leading by the line 458 to and through the right-hand blade of the now closed relay 393, thence by the line 459 to the line 433, leading to the coil terminal of the relay 393. This action deenergizes the relay 393 because the remaining line 433 has likewise been deenergized by the opening of the front-left-on switch 214 beyond the line 434 leading through the diameter switch 299.

Current can now pass from the energized line 438 through the left-hand switch blade of the split relay 395, along the lines 448 and 450, through the left-hand switch blade of the now open relay 393, thence along the line 460 to and through the switch blade of the front-out relay 394. The latter has been previously energized by current passing from the energized line 428, through the branch line 430 to and through the coil of the front-out relay 394 by the lines 423 and 421, to and through the front-out switch 266 to the ground. The current therefore continues from the switch blade of the front-out relay 394, along the line 461 to and through the right-hand vertical contacts and switch blade of the feed-out switch 382, thence along the line 462, to and through the front-in magnetic clutch 128 to the ground. The front-in clutch 128 therefore closes and because the front carriage apron mechanism has been reversed by the shifting of the apron control lever 77, in the manner previously described, the tool is now caused to feed out.

The front tool continues to move out until the diameter limit switch 219 is closed by its encountering the rear end of the micrometer stop 218, and as the front-left-out switch 214 has again closed the circuit is now energized between the front-left switch 283 and the coil of the relay 393, by way of the front-left-out switch 214, the line 434, the diameter limit switch 219 and the line 433 to the coil terminal of the relay 393. The latter now closes as before, permitting current to go from the left-hand switch blade of the split relay 395, along the lines 448 and 450, through the left-hand switch blade of the relay 393, along the line 451, to and through the right-hand switch blade of the relay 400, along the line 452, to and through the left-hand switch blade of the front-in-left relay 392, thence along the line 456, to and through the front-left switch 375, thence along the line 457 to the front-left magnetic clutch 110, energizing it and causing the tool to feed again to the left.

The tool continues to feed to the left until the front-left-out limit switch 214 encounters the front end of the next micrometer stop 218, and is thereby opened. This action again deenergizes the relay 393, in the manner just described, and causes the tool again to feed out. The front tool will feed out and left alternately as many times as there are micrometer stops 218, turning the required number of stepped portions upon the workpiece.

As the last micrometer stop is passed and the last step is turned upon the workpiece, the front tool will feed out until the front-out limit switch 266 is opened by the motion of the tool slide. This opens the circuit in the lines 421 and 422, leading to the coil of the split relay 395, deenergizing one side thereof and also opening the circuit in the line 423, leading to the coil of the front-out relay 394, likewise deenergizing the latter. This action deenergizes the line 461, leading through the feed-out switch 382, along the line 462 to the front-in magnetic clutch 128, causing the front carriage to halt temporarily in this position.

The remainder of the cycle of operations is the same for the first, second and third circuits, hence, it will be sufficient to describe only that of the first circuit. Meanwhile, the rear carriage comes into operation. The rear-in limit switch 360 is normally closed and is connected to the rear-in switchboard switch 377 through the lines 447, 446 and 445, previously described. The operator now depresses the rear-in switchboard switch 377 to its "jog" position, whereupon current goes from the line 445, along the line 463, to the coil of the rear-in relay 397, energizing it and closing its switchblade. The current continues along the line 464 to the coil of the time relay 389.

By the closing of the rear-in relay 397 current goes from the line 408, over the left-hand switch blade of the split relay 395 by way of the lines 448 and 449, across the switch blade of the rear-in relay 397, along the line 465 to the rear-in magnetic clutch 146, energizing this and causing the rear tool to feed inward toward the workpiece. The rear tool continues to feed inward until its tool slide causes the rear-in limit switch 360 to open, stopping the motion of the tool. If, however, the rear-in switchboard switch 377 remains in the automatic or upper position, as shown in Figure 29, the front carriage in its motion to the left closes the rear pick-up limit switch 390.

This action of the front carriage automatically closes the circuit of the rear-in magnetic clutch 146 by energizing the circuit from the line 463 at the rear-in switchboard switch 377, through this switch and along the line 424, through the rear pick-up switch, thence along the line 444, to and through the coil of the split relay 395 to the line 428, which has been energized in the manner previously described, from the line 408, through the switchblade of the cycle starting relay 399. The line 463 has been energized because it runs back to the coil terminal of the rear-in relay 397, the coil having been energized from the previously energized line 428.

By either automatic or manual control of the rear carriage operation, as described, when the rear-in limit switch 360 is opened by the motion of the rear tool slide, the right-hand half of the split relay 395 opens by the consequent deenergization of the lines 447, 446, 445 and 444 leading to the coil thereof. The deenergization of the split relay 395 causes its switch blades to move to the right, thereby deenergizing the line 448, which has previously received current across the left-hand switch blade. This action also deenergizes the line 449 leading from the line 448, through the switch blade of the rear-in relay 397, along the line 465 to the rear-in magnetic clutch 146, opening the clutch and stopping the inward motion of the rear tool slide and tool. The closing of the line 463, in rear-in relay by the energization of the line 463, in the manner previously described, also energizes the line 464 leading therefrom to the coil of the time relay 389. The energization of the latter opens its contacts and breaks the circuit between the lines 410 and 411, leading from the opposite sides thereof.

After the rear-in limit switch 360 opens and consequently deenergizes the coil of the time relay 389, as well as the coil of the rear-in relay 397, the action of the time relay causes a definite time lag to occur before its blade again closes the circuit between the lines 410 and 411. This time lag allows the rear tool slide to remain stationary for a short interval of time, thus causing the tool to dwell against the work for sizing or cleaning up the cut. As the time relay 389 closes, by reason of its deenergization, current passes from the line 408, across the left-hand switch blade of the now open split relay 395, through the line 410, the switch blade of the time relay 389, the line 411, the branch line 412, the left-hand switch blade of the now open relay 400, the line 413, across the blade of the front-right limit switch 282, and over the line 466 to the front-right magnetic clutch 113, energizing and closing the clutch. The front carriage will then move to the right at a rapid traverse speed until it opens the front-right limit switch 282, deenergizing the front-right magnetic clutch circuit and causing the front carriage to stop in its starting position.

At the same time as the rear-out switch is closed, current is permitted to go from the line 408, across the left-hand blade of the now open split relay 395, through the line 410, the switch blade of the time relay 389 and the line 411, through the rear-out limit switch 365, thence along the line 467 to the rear-out magnetic clutch 108, energizing the latter and causing the rear tool to move outward at a rapid traverse speed until the rear-out switch 365 is opened by the motion of the rear carriage. This action deenergizes the rear-out magnetic clutch 108 and stops the rear carriage in its starting position.

At the same time that the split relay 395 opens the cycle start relay closes by the current received from the line 408, across the left-hand blade of the split relay 395, through the line 410, the switch blade of the time relay 389, the line 411, the branch line 414, the start switch 386 and the line 416, to and through the coil of the cycle start relay 399 to the ground.

This action opens the circuit through the blade of the cycle start relay 399, to the line 428, deenergizing it and the apparatus connected to it, namely, the coil of the pump relay 396, the coil of the brake and clutch relay 398, the coil of the split relay 395 and the coil of the time relay 389; and also the opposite side of the coil of the rear-in relay 397, which, however, has been previously deenergized by the opening of the circuit in the line 463. The deenergization of the brake and clutch relay 398 causes the circuit to be opened in the line 437 and closed in the line 409, thereby opening the main magnetic clutch 28 and applying the magnetic brake 34 to the shaft 36, stopping the machine. This closes the operating cycle of the lathe.

To stop the spindle when the machine is running, the operator depresses the spindle control switch 378. This breaks the circuit in the line 436 running to the coil of the brake and clutch relay, deenergizing it and causing the main clutch 28 to be released and the brake 34 to be applied, in the manner previously described. If, while the carriage is feeding to the left, it becomes necessary to cause it to move at rapid traverse speed to the right, this can be done by manually closing the "inch right" switch 379. This action also energizes the relay 400 by way of the line 429, leading from its coil to the ground through the "inch right" switch 379. The split relay 395 being closed, current is permitted to go across its left-hand switch blade, over the line 448, to and through the blade of the now closed relay 400, thence over the line 413, to and through the closed front-right switch to the front-right magnetic clutch, energizing the latter and causing the front carriage and tool to rapid traverse to the right.

The same action deenergizes the front-left clutch 110 by the opening of the blade contacts of the relay 400, opening the circuit from its point of energization at the left-hand switch blade of the split relay 395 by way of the line 448, the line 450, the switch blade of the now closed relay 393, the line 451, to and through the right-hand switch blade of the relay 400, the line 452, to and through the left-hand switch blade of the now open front-in-left relay 392, the line 456, to and through the front-left switchboard switch 375 and the line 457 to the front-left magnetic clutch 110.

*Operating cycle—second circuit*

The second circuit (Figure 30) differs from the first circuit in a few details of its arrangement. The front-left-on switch 214 and the diameter switch 219 at the left-hand side of the wiring diagram are omitted, and the line 458 runs to the front-left switch 283 in a direct path from the relay 393. The line 433 leading from the diameter switch 219 to the relay 393 in the first circuit has been eliminated in the second circuit. The right-hand switch blade of the relay 393 has been eliminated, and the upper end of the line 458, which was formerly connected therewith, has been reconnected to the lower coil terminal of the relay 393 by the branch line 458, replacing the deleted line 433. The line 459 from the former line 433, and the blade contact of the relay 393, likewise have been deleted. All of these changes are apparent from a comparison of the wiring diagrams in Figures 29 and 30.

It will be observed also that instead of reversing the front carriage apron mechanism by the use of the apron lever 77, as in the first circuit, the operator in the second circuit leaves this in its forward position so that the front-out clutch controls the front-out movements instead of the front-in movements, as in the first circuit. In the second circuit also, the feed-in switch 381 and the feed-out switch 382 occupy opposite positions from the positions in Figure 1.

It will be later observed that in the third circuit (Figure 31) the same changes have been made as in the second circuit, so that the third circuit is substantially the second circuit with the addition of certain other features to be described below.

To accomplish the operating cycle of the second circuit (Figure 19), the operator performs the same steps as in the first circuit, described above under "Operating cycle—first circuit", and the same electrical connections result, with minor differences. Accordingly, it will be sufficient to describe these differences rather than repeat the entire series of electrical occurrences.

The operator first depresses the start cycle switch 386, as before, and the relay 393 closes in the preceding manner. As the limit switches 214 and 219 have been omitted in the second circuit, however, and the front-left limit switch 283 is closed at the start of the operations, the circuit is thereby closed from the ground through the front-left switch 283 and the line 458 to the coil terminal of the relay 393, instead of in the manner described in connection with the first circuit. The remainder of the energizations, which accompany the depressing of the start cycle switch 386, are the same as in the first circuit.

The operator depresses the front-in switchboard switch 376 to the "jog" position, and also shifts the feed-in switch to interconnect the vertical contacts on the right-hand side instead of on the left-hand side, as before. At the same time he shifts the feed-out switch 382 to interconnect the left-hand vertical contacts instead of the right-hand contacts, as before. With these operations performed, current now proceeds from the line 453, which has been energized in the same manner as in the first circuit, described above, through the front-in manual switch 376, along the line 454, through the switch blade of the feed-out switch 382, through the line 462 to the front-in magnetic clutch 128. This clutch then closes and causes the front tool to move inward at a feeding rate. The front tool moves inward at a feeding rate until the front-in limit switch 267 is opened by the motion of the tool slide. The operator shifts the front-left switchboard switch 375 in the previous manner, and current goes to the front-left magnetic clutch 110, as described above, causing the front tool to move to the left at a feeding speed. The front tool continues to move to the left until it encounters the front-left limit switch 283, opening it, and consequently opening the circuit between it and the coil of the relay 393 along the line 458. This action deenergizes the relay 393 and opens its contacts. Current now goes from the line 448, which has been energized in the same manner as in the first circuit through the sole switch blade of the relay 393 to the right-hand blade contact, thence along the line 460 and through the switch blade of the front-out relay 394 (which has been closed in the manner described in connection with the first circuit), thence along the line 461 to the feed-in switch 381, across its blade, to and through the line 455 to the front-out magnetic clutch 122, closing it and causing the front tool to feed outwardly at a rapid traverse speed.

The front tool continues to feed out until it opens the front-out limit switch 266 by the motion of the tool slide, whereupon the foregoing circuit to the front-out clutch 122 is broken, when the circuit along the lines 421 and 422 leading to the split relay 395 is thus opened, deenergizing the split relay 395 and the front-out clutch 122 in the same manner as in the first circuit. The front carriage thus temporarily halts in this position.

Meanwhile, the rear carriage and rear tool come into action, either manually or automatically, by the action of the rear carriage pick-up switch, in the manner described in connection with the first circuit. The rear carriage goes through the same motions, and the same electrical circuits are made and broken in the same manner as in the first circuit, already described, hence, a further description thereof is unnecessary. The rear tool moves inward at a feeding speed, executes its cut, hesitates under the action of the time relay 389 for a predetermined period in order to clean up the cut, and then moves backward to its starting point at a rapid traverse speed, while the front tool likewise moves backward to its starting point, also at a rapid traverse speed.

Operating cycle—third circuit

The third circuit (Figure 31) makes the same changes in the first circuit as did the second circuit, described above. The front-left-out limit switch 214 and the diameter limit switch 219 have been omitted, and the front-left limit switch 283 directly connected by the line 458 to the coil of the relay 393, whose second blade has similarly been omitted, and the lines 433 and 459 deleted. Additional circuits have been added, however, to energize the additional front-in rapid traverse magnetic clutch 167, which appears at the extreme lower left-hand side of the wiring diagram (Figure 31). The additional front-in traverse limit switch 318 appears immediately above the front-in limit switch 267 and is connected by the line 427, through the front-in traverse switch 391 to the front-in traverse relay 401, controlling the energization of the front-in traverse relay 167.

The opposite terminal of the coil of the front-in traverse relay 401 is connected by the line 425 to the coil terminal of the front-in relay 392 at its junction with the line 417. The blade terminal of the front-in traverse relay 401 is connected by the line 470 to the left-hand blade contact of the front-in-left relay 392, whose previous connection to the line 453 has been deleted. The line 453 is now connected to the right-hand blade contact of the front-in traverse relay 401. From the left-hand blade contact of the front-in traverse relay 401 the line 471 runs to the front-in traverse magnetic clutch 167. Otherwise, the connections are the same as in the second circuit, previously described. In the third circuit the feed-in switch 381 and feed-out switch 382 are maintained in the same positions as in the second circuit, that is, directly opposite from the first circuit positions. The front apron carriage mechanism is likewise not reversed.

After the operator shifts the start cycle switch 386 the same energizations take place as in the second cycle. As the split relay 395 closes, however, and its left-hand blade energizes the line 448 from the line 408, in the manner previously described, this current flows along the line 449 to the blade of the now closed rear-in relay; also along the line 450, to and through the sole blade of the relay 393, along the line 451, to and through the right-hand blade of the relay 400, thence along the line 452, to and through the left-hand switch blade of the front-in-left relay 392, thence along the line 470, to and through the blade of the front-in traverse relay 401, thence along the line 471 to the front-in traverse magnetic clutch 167, closing it and causing the front tool to move inward at a rapid traverse speed.

The front tool moves inward at this rapid traverse speed until its tool slide opens and rapid traverse stop 311 partly depresses the push rod 260 leading to the switch controlled thereby (Figures 15 and 16). This action separates the left-hand contacts 325 and 321 of the front-in traverse switch 318, whereas the contacts 324 and 320 of the feed-in switch on the right-hand side (Figure 15) remain closed through the action of the spring 331. Consequently, the circuit is broken in the line 427 (Figure 31), deenergizing the coil of the front-in traverse relay 401 and causing its switch blade to sever its connection with the line 471 and make a connection with the line 453. The current now goes through the switch blade of the front-in traverse relay 401, along the line 453, to and through the front-in switchboard switch 376, thence along the line 454, to and through the switch blade of the feed-out switch 382, thence along the line 462 to the front-in magnetic clutch 128, energizing it and causing the tool to continue to move inward, but at a feeding speed instead of the previous traverse speed.

The front tool continues to feed inward in this manner until the contact portion 317 (Figure 14) of the stop member 312 encounters the push rod 260 and pushes it downward the remaining distance. This action opens the front-in limit switch 267, which is the right-hand portion of the switch shown in Figures 15 and 16. The contacts 324 and 320 now separate, opening the circuit in the line 420 leading therefrom (Figure 31). The front tool then moves to the left at a feeding speed, in the same manner and with the same making and breaking of the electrical circuits, as described in connection with the second circuit, until it reaches its temporary halting position at the end of its outward rapid traverse path.

The rear tool and rear carriage now go through the same cycle as described in connection with the first and second circuits, and the same making and breaking of the electrical circuits occur. The rear tool feeds inward to its predetermined position, hesitates through the action of the time relay 389, while the rear tool cleans up the cut, and then returns, at a rapid traverse speed, to its starting position, while the front tool likewise rapid traverses back to its starting position. The rear carriage action is similarly brought into operation, either manually or automatically, by the rear carriage pick-up switch 390, in the manner previously described.

While the foregoing description has been given in the embodiment of the invention in a lathe, it will be understood that it may likewise be used in connection with any machine tool having a tool which moves through a cycle in an analogous manner.

It will also be understood that the herein-described arrangement whereby the tool is caused to rapid traverse inward to a predetermined point and then feed inward more slowly beyond that point is not limited to use in a single-voltage circuit but may be employed in circuits utilizing a plurality of circuits.

I desire to comprehend within my invention such modifications as may be embraced within my claims and the scope of my invention.

Having thus fully described my invention, what I claim as new and desire to secure by Letters Patent, is:

1. A machine tool comprising a work-holder, a tool, a source of power, electrically-actuated means for moving said tool toward said work-holder, electrically-actuated means for moving said tool away from said work-holder, switch means for controlling the supply of electricity to said electrically-actuated means, and time delay means for maintaining said tool in a predetermined position after the deenergization of one of said tool-moving means.

2. A machine tool comprising a work-holder, a tool, a source of power, electrically-actuated means for moving said tool relative to said work-holder, means for controlling the supply of electricity to said electrically-actuated means, and time delay means for maintaining said tool in a fixed position for a predetermined period of time after the operation of said electrical supply controlling means.

3. A machine tool comprising a work-holder, a tool, a source of power, means for moving said tool toward and away from said work-holder, a clutch for controlling the connection of said tool-moving means to said source of power, and electrically actuated time delay means for maintaining said tool temporarily in a fixed position for a predetermined period of time after the shifting of said clutch.

4. A machine tool comprising a work-holder, a tool, means for moving said tool toward and away from said work-holder, a pair of electro-magnetic clutches for connecting said tool-moving means to said source of power, one of said clutches being arranged to cause said tool to be moved toward said work-holder and the other clutch being arranged to cause said tool to be moved away from said work-holder, positionally-responsive means for rendering one of said clutches inoperative while rendering the other clutch operative, and time delay means for delaying the action of one of said clutches for a predetermined period of time after the actuation of said positionally-responsive means.

5. A machine tool comprising a work-holder, a tool, a tool slide for said tool, a carriage for said tool slide, a source of power, means for moving said carriage longitudinally relative to said work-holder, means for moving said tool slide transversely relative to said work-holder, electrically-actuated means for connecting said tool slide moving means and said carriage moving means to said source of power, and time delay means for delaying the connection of one of said moving means after the cessation of the other moving means.

6. A machine tool comprising a work-holder, a tool, a source of power, means for moving said tool longitudinally relative to said work-holder, means for moving said tool transversely relative to said work-holder, a plurality of steps arranged in spaced locations in stepped positions relative to one another, an electro-magnetic clutch for controlling the connection of said longitudinal moving means to said source of power, an electro-magnetic clutch for controlling the connection of said transverse moving means to said source of power, and a switch for regulating the supply of electricity to each magnetic clutch, one of said switches being arranged to engage the sides of said stops and the other the ends of said stops during the motion of said tool, whereby to cause said switches to energize said clutches alternately and cut a plurality of stepped portions of predetermined dimensions upon the work.

7. A machine tool comprising a source of power, a work-holder, a front tool, a rear tool, means for moving said front tool from and toward the work-holder, means for moving said rear tool toward and from the work-holder, means responsive to the motion of said front tool-moving means to cause the actuation of said rear tool-moving means, and time-responsive means for delaying the withdrawal of one tool after the actuation of the withdrawal mechanism.

8. A machine tool comprising a source of power, a work-holder, a tool, means for moving said tool rapidly toward said work-holder, means for moving said tool slowly toward said work-holder, and positionally-responsive means for rendering the rapidly moving means inoperative and the slowly moving means operative.

9. A machine tool comprising a source of power, a tool, a work-holder, means for moving said tool rapidly toward said work-holder, means for moving said tool slowly toward said work-holder, an electro-magnetic clutch for connecting each of said moving means to said source of power, and positionally-responsive means for energizing one of said clutches and deenergizing the other of said clutches at a predetermined point in the travel of said tool toward said work-holder.

10. A machine tool comprising a source of power, a work-holder, a tool, means for moving said tool rapidly relatively to said work-holder, means for moving said tool slowly relatively to said work-holder, an electro-magnetic clutch for connecting each of said moving means to said source of power, switch means for controlling the supply of electricity to said magnetic clutches, and positionally-responsive means for actuating said switch means to deenergize the clutch for rapidly moving said tool and to energize the clutch for slowly moving said tool when said tool arrives at a predetermined position in its path of travel relative to said work-holder.

11. A machine tool comprising a work-holder, a tool, a source of power, means for moving said tool rapidly in a direction transverse to said work-holder, means for moving said tool slowly in a direction transverse to said work-holder, means for moving said tool longitudinally relative to said work-holder, and positionally-responsive means for initiating the operation of said slow-moving means and stopping the operation of said rapid-moving means when said tool arrives at a predetermined position in its transverse path relative to said work-holder.

12. A machine tool comprising a work-holder, a tool, a source of power, electrically-actuated means for moving said tool rapidly toward said work-holder, electrically-actuated means for moving said tool slowly toward said work-holder, a pair of switches arranged to control the supply of electricity to said electrically-actuated means, and stop means arranged to actuate said switches at a predetermined position in the motion of said tool so as to halt the rapid motion thereof and initiate the slow motion thereof to said predetermined positions.

13. A machine tool comprising a work-holder, a source of power, a bed, a carriage, means for moving said carriage along said bed, a cross slide, means for moving said cross slide across said carriage, electro-magnetic means for connecting said carriage moving means to said power source, electro-magnetic means for connecting said cross slide moving means to said power source, a pair of switches arranged to energize and deenergize both of said electro-magnetic means, and a plurality of stops arranged in stepped positions, said switches being arranged to engage different portions of said stops alternately to cause said cross slide and said carriage to move alternately for predetermined distances in response to the positions of said stops, whereby to cut a plurality of portions of different predetermined dimensions upon the work.

14. A machine tool comprising a work-holder, a source of power, a bed, a carriage, means for moving said carriage along said bed, a cross slide, means for moving said cross slide across said carriage, electro-magnetic means for connecting said carriage moving means to said power source, electro-magnetic means for connecting said cross slide moving means to said power source, a pair of switches arranged to energize and deenergize both of said electro-magnetic means, a plurality of stops arranged in stepped positions, said switches being arranged to engage different portions of said stops alternately to cause said cross slide and said carriage to move alternately for predetermined distances in response to the positions of said stops, whereby to cut a plurality of portions of different predetermined dimensions upon the work, and a stop holder arranged to be moved relative to said bed.

15. A machine tool comprising a work-holder, a source of power, a bed, a carriage, means for moving said carriage along said bed, a cross slide, means for moving said cross slide across said carriage, electro-magnetic means for connecting said carriage moving means to said power source, electro-magnetic means for connecting said cross slide moving means to said power source, a pair of switches arranged to energize and deenergize both of said electro-magnetic means, a plurality of stops arranged in stepped positions, said switches being arranged to engage different portions of said stops alternately to cause said cross slide and said carriage to move alternately for predetermined distances in response to the positions of said stops, whereby to cut a plurality of portions of different predetermined dimensions upon the work, a stop holder arranged to be moved relative to said bed, and micrometric means for moving said stop holder relative to said bed.

16. A machine tool comprising a work-holder, a front tool, a rear tool, means for moving the rear tool toward and away from the work, means for rapidly traversing the front tool inwardly toward the work, means for feeding the front tool inwardly at a slower rate of speed, means for halting the rapid motion of said front tool and starting the slow motion thereof at a predetermined point on the inward motion thereof, means for moving the front tool longitudinally in one direction, means for moving the front tool rapidly outward from the work-holder, means for moving the front tool rapidly back to the starting point in a longitudinal direction, and means responsive to the motion of said front tool moving means to initiate the actuation of said rear tool moving means.

17. A machine tool comprising a tool, a source of power, a work-holder, means for moving said tool rapidly in a direction transverse to said work-holder, means for moving said tool slowly in said transverse direction, an electro-magnetic clutch for connecting each of said tool-moving means to said source of power, a relay for controlling the supply of electricity to said magnetic clutches, a switch arranged to control said relay, and stop means arranged to actuate said switch to deenergize one clutch and energize the other clutch at a predetermined position along the initial path of said tool.

18. A machine tool comprising a rotatable work holder, a bed, a carriage movable on said bed, a tool movable on said carriage, a plurality of stops mounted on the front of said bed and adapted to be arranged in stepped positions, and a pair of switches adapted to be alternately engaged by different portions of said stops and arranged to control circuits providing alternate longitudinal and transverse motion to said tool relative to said work holder.

19. In an electrical control system for automatic machine tools having work and tool-operating mechanisms, a power circuit, a driving motor, a lower voltage control circuit, means for reducing the voltage of said power circuit to the voltage of said lower voltage control circuit, a circuit including a magnetic clutch for moving the tool rapidly relatively to the work holder, a circuit including a magnetic clutch for moving the tool slowly relative to said work holder, switch means in said circuits for controlling the supply of electricity to said magnetic clutches, and positionally-responsive means for actuating said switch means to deenergize the clutch circuit for rapidly moving said tool and to energize the clutch circuit for slowly moving said tool when said tool arrives at a predetermined position in its path of travel relatively to the work holder.

20. In an electrical control system for automatic machine tools having work and tool-operating mechanisms, a power circuit, a driving motor, a lower voltage control circuit, means for reducing the voltage of said power circuit to the voltage of said lower voltage circuit, a carriage circuit; an in magnetic clutch, a left magnetic clutch, an out magnetic clutch and a right magnetic clutch in said carriage circuit; relay means in said carriage circuit for controlling the energization of said magnetic clutches, and switch means operated by the motion of said carriage for selectively energizing said clutches according to the motion of said tool, said clutches and said relay means being energized by said lower voltage circuit.

21. In an electrical control system for automatic machine tools having work and tool-operating mechanisms, a power circuit, a driving motor, a lower voltage control circuit, means for reducing the voltage of said power circuit to the voltage of said lower voltage circuit, a carriage circuit; an in magnetic clutch, a left magnetic clutch, an out magnetic clutch and a right magnetic clutch in said carriage circuit; relay means in said carriage circuit for controlling the energization of said magnetic clutches, switch means operated by the motion of said carriage for selectively energizing said clutches according to the motion of said tool, said clutches and said relay means being energized by said lower voltage circuit, a magnetic clutch for operatively connecting a work holder to the driving motor, a magnetic brake for stopping said work holder, and a starting switch arranged to alternately operate said work holder clutch and said work holder brake, all of said clutches being energized by said lower voltage circuit.

22. In an electrical control system for automatic machine tools having work and tool-operating mechanisms, a power circuit, a driving motor, a lower voltage control circuit, means for reducing the voltage of said power circuit to the voltage of said lower voltage circuit, a carriage circuit; an in magnetic clutch, a left magnetic clutch, an out magnetic clutch and a right magnetic clutch in said carriage circuit; relay means in said carriage circuit for controlling the energization of said magnetic clutches, switch means operated by the motion of said carriage for selectively energizing said clutches according to the motion of said tool, said clutches and said relay means being energized by said lower voltage circuit, and a plurality of stops arranged in stepped positions, said switch means including a pair of switches arranged to be closed and opened alternately by said stepped stops and adapted to operate said left and said out clutches alternately and at changing points determined by the locations of said stepped stops.

23. In an electrical control system for automatic machine tools having work and tool-operating mechanisms, a power circuit, a driving motor, a lower voltage control circuit, a carriage circuit; an in magnetic clutch, a left magnetic clutch, an out magnetic clutch, a right magnetic clutch and a rapid traverse-in magnetic clutch, said clutches being arranged respectively to control the inward, leftward, outward, rightward and rapid traverse inward motions of the tool, and a limit switch operated during the inward motion of the tool for deenergizing the rapid traverse-in magnetic clutch and simultaneously energizing the in magnetic clutch, said carriage circuit being energized by said lower voltage circuit.

24. In an electrical control system for automatic machine tools having work and tool-operating mechanisms, a power circuit, a driving motor; a front carriage actuating circuit containing a front-in magnetic clutch, a front-left magnetic clutch, a front-out magnetic clutch and a front-right magnetic clutch; a rear carriage circuit including a rear-in magnetic clutch and a rear-out magnetic clutch; relay means for controlling the energization of said magnetic clutches, and limit switches operated by the motion of said front and rear carriages for controlling the energization of said relays, said carriage circuits being energized from a common control circuit having a lower voltage than said power circuit.

25. In an electrical control system for automatic machine tools having work and tool-operating mechanisms, a power circuit, a driving motor; a front carriage actuating circuit containing a front rapid traverse-in magnetic clutch, a front-in magnetic clutch, a front-left magnetic clutch, a front-out magnetic clutch and a front-right magnetic clutch; a rear carriage circuit including a rear-in magnetic clutch and a rear-out magnetic clutch; relay means for controlling the energization of said magnetic clutch, and limit switches operated by the motion of said front and rear carriages for controlling the energization of said relays, said carriage circuits being energized from a common control circuit having a lower voltage than said power circuit, said limit switches including switch means for simultaneously deenergizing said rapid traverse-in magnetic clutch and energizing said front-in magnetic clutch, said switch means being arranged to be operated at a predetermined position on the inward path of motion of the tool.

26. In an electrical control system for automatic machine tools having work and tool-operating mechanisms, a power circuit, a driving motor, a lower voltage control circuit, a carriage circuit; an in magnetic clutch, a left magnetic clutch, an out magnetic clutch, a right magnetic clutch and a rapid traverse-in magnetic clutch, said clutches being arranged respectively to control the inward, leftward, outward, rightward and rapid traverse inward motions of the tool, a limit switch operated during the inward motion of the tool for deenergizing the rapid traverse-in magnetic clutch and simultaneously energizing the in magnetic clutch, a main magnetic driving clutch and a magnetic brake for said work holder, and a starting switch arranged selectively to control the energization of said brake and clutch alternately, all of said magnetic clutches and said magnetic brake being energized by said lower voltage control circuit.

PHILBER A. ABE.